US010962725B2

(12) United States Patent
Nakama et al.

(10) Patent No.: US 10,962,725 B2
(45) Date of Patent: Mar. 30, 2021

(54) FERRULE STRUCTURE

(71) Applicant: Fujikura Ltd., Tokyo (JP)

(72) Inventors: Akihiro Nakama, Sakura (JP); Hirotaka Asada, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/763,826

(22) PCT Filed: Aug. 6, 2018

(86) PCT No.: PCT/JP2018/029439
§ 371 (c)(1),
(2) Date: May 13, 2020

(87) PCT Pub. No.: WO2019/097776
PCT Pub. Date: May 23, 2019

(65) Prior Publication Data
US 2020/0341207 A1    Oct. 29, 2020

(30) Foreign Application Priority Data

Nov. 16, 2017 (JP) .............................. JP2017-221253

(51) Int. Cl.
G02B 6/38 (2006.01)
(52) U.S. Cl.
CPC ........... *G02B 6/3847* (2013.01); *G02B 6/382* (2013.01); *G02B 6/3853* (2013.01); *G02B 6/3882* (2013.01)
(58) Field of Classification Search
CPC .... G02B 6/3847; G02B 6/382; G02B 6/3853; G02B 6/3882; G02B 6/32; G02B 6/36; G02B 6/40
See application file for complete search history.

(56) References Cited

U.S. PATENT DOCUMENTS

| | | | | |
|---|---|---|---|---|
| 6,012,852 A * | 1/2000 | Kadar-Kallen | ......... | G02B 6/32 385/74 |
| 6,356,686 B1 | 3/2002 | Kuczynski | | |
| 7,393,142 B2 * | 7/2008 | Dean, Jr. | ............. | G02B 6/3839 385/58 |
| 8,016,491 B2 * | 9/2011 | Takaoka | ............... | G02B 6/3885 385/60 |

(Continued)

FOREIGN PATENT DOCUMENTS

| | | |
|---|---|---|
| CN | 102455466 A | 5/2012 |
| CN | 102879863 A | 1/2013 |

(Continued)

OTHER PUBLICATIONS

International Search Report issued in International Application No. PCT/JP2018/029439, dated Oct. 23, 2018 (5 pages).

*Primary Examiner* — Ryan A Lepisto

(74) *Attorney, Agent, or Firm* — Osha Bergman Watanabe & Burton LLP

(57) ABSTRACT

A ferrule structure includes: a holding aperture that holds light guide members forming light guides; a recess that is recessed from a connection end surface with respect to a mating ferrule; a first lens array on a base surface that is a bottom surface of the recess; and a first groove that is recessed from the base surface and is on an outer side of the first lens array. The first lens array includes lenses that are aligned with the light guides.

8 Claims, 16 Drawing Sheets

(56) References Cited

U.S. PATENT DOCUMENTS

| | | | |
|---|---|---|---|
| 8,109,679 B2 * | 2/2012 | Danley | G02B 6/3885 385/85 |
| 8,651,749 B2 * | 2/2014 | Dainese J nior | G02B 6/3869 385/74 |
| 8,740,474 B2 * | 6/2014 | Lu | G02B 6/3684 385/85 |
| 9,405,076 B2 * | 8/2016 | Chen | G02B 6/32 |
| 9,465,170 B1 * | 10/2016 | Childers | G02B 6/32 |
| 9,563,027 B2 * | 2/2017 | Childers | G02B 6/4403 |
| 9,645,318 B2 * | 5/2017 | Moriyama | G02B 6/3885 |
| 10,222,559 B2 * | 3/2019 | Nakama | G02B 6/36 |
| 10,401,568 B2 * | 9/2019 | Lu | G02B 6/25 |
| 10,768,380 B2 * | 9/2020 | Nakama | G02B 6/40 |
| 2011/0317959 A1 | 12/2011 | Ohta et al. | |
| 2012/0145307 A1 * | 6/2012 | Margolin | G02B 6/3885 156/72 |
| 2013/0011100 A1 * | 1/2013 | Shiraishi | G02B 6/325 385/77 |
| 2013/0308910 A1 | 11/2013 | Nishimura et al. | |
| 2014/0169743 A1 * | 6/2014 | Hodge | G02B 6/403 385/54 |
| 2014/0321814 A1 | 10/2014 | Chen et al. | |
| 2020/0264386 A1 * | 8/2020 | Hodge | G02B 6/3839 |

FOREIGN PATENT DOCUMENTS

| | | |
|---|---|---|
| JP | H7-181350 A | 7/1995 |
| JP | 2003107277 A | 4/2003 |
| JP | 2006323034 A | 11/2006 |
| JP | 2008151843 A | 7/2008 |
| JP | 2012013805 A | 1/2012 |
| JP | 2013213949 A | 10/2013 |
| JP | 2014521996 A | 8/2014 |
| WO | 2013053708 A1 | 4/2013 |

* cited by examiner

FERRULE STRUCTURE

TECHNICAL FIELD

The present invention relates to a ferrule structure.

BACKGROUND

There has been known a technique relating to an optical connector with lens ferrules that optically connects optical fibers to each other with the facing ferrules each having a lens at an end surface. Patent Literature 1 discloses that a ferrule body holding an optical fiber and a lens are integrally formed to reduce work for aligning and assembling the ferrule body and the lens.

Further, there has been known a configuration in which a ferrule body holding an end part of an optical fiber is formed separately from a lens array. Patent Literature 2 discloses that a front surface of a ferrule body and an endface of an optical fiber are polished, and then a lens array is attached to the front surface of the ferrule body.

In the ferrule described in Patent Literatures 1 and 2, a recess is formed in the end surface of the ferrule, and the lens array is arranged on a bottom surface of the recess. However, in the configuration in which a base surface of the lens array is set to the bottom surface of the recess, when a water droplet is formed in the recess under high-temperature and high-humidity environment, the water droplet is more likely to adhere to the lens. If the water droplet adheres to the lens being an optical path, light is dispersed, and a transmission loss is increased. Note that, even after the water droplet adhering to the lens is evaporated, a water scale is formed on the lens in some cases, and there may be a possibility in that light is dispersed due to the water scale.

One or more embodiments of the present invention suppress adhesion of a water droplet to a lens.

PATENT LITERATURE

Patent Literature 1: JP 2008-151843A
Patent Literature 2: JP 2014-521996A

SUMMARY

One or more embodiments of the present invention relate to a ferrule structure comprising: a holding part (i.e., "holding aperture") that holds light guide members forming a plurality of light guides; a recess that is recessed from a connection end surface with respect to a mating ferrule; and a lens array that is formed on a base surface being a bottom surface of the recess and includes a plurality of lens parts (i.e., "lenses") arranged correspondingly to the light guides, wherein a groove part (i.e., "groove") that is recessed from the base surface having the lens array formed on the base surface is formed on an outer side of the lens array.

Other features of the invention are made clear by the following description and the drawings.

According to one or more embodiments of the present invention, adhesion of a water droplet to the lens can be suppressed.

DETAILED DESCRIPTION

Figure 1A:
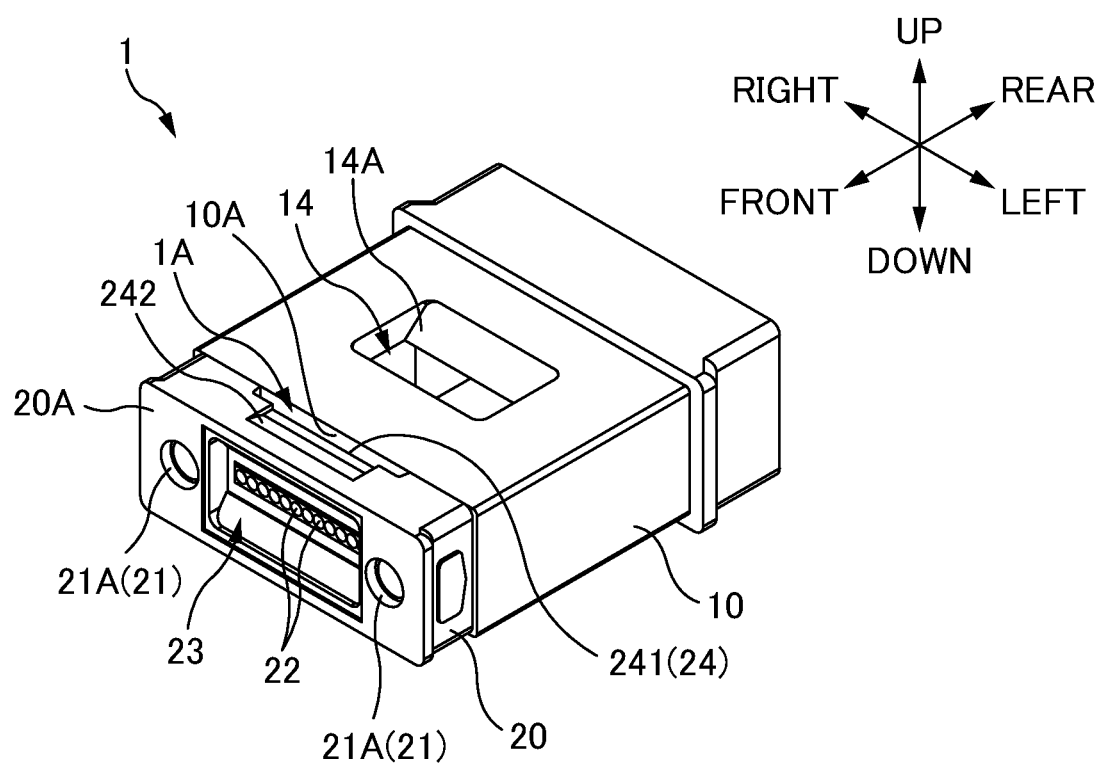
FIG. 1A and FIG. 1B are general perspective views of a ferrule structure 1 according to one or more embodiments.

At least the following matters are made clear from the following description and the drawings.

It is apparent that a ferrule structure comprising: a holding part that holds light guide members forming a plurality of light guides; a recess that is recessed from a connection end surface with respect to a mating ferrule; and a lens array that is formed on a base surface being a bottom surface of the recess and includes a plurality of lens parts arranged correspondingly to the light guides, wherein a groove part that is recessed from the base surface having the lens array formed on the base surface is formed on an outer side of the lens array. According to the ferrule structure described above, adhesion of a water droplet to the lens can be suppressed.

The groove part may be formed between a lens part at an end part of the lens array and a side wall surface of the recess. With this, adhesion of a water droplet to the lens part at the end part can be suppressed.

A step surface that is inclined may be formed between the base surface and a bottom surface of the groove part. With this, a water droplet adhering to a base part is more likely to flow down to the groove part.

A width of the base surface between an edge of a lens part and the groove part may be equal to or smaller than a radius of the lens part. With this, water droplets are joined easily, and the water droplet adhering to the base part is more likely to flow down to the groove part.

An antireflection film may be formed on a surface of the lens part; and an inner wall surface of the recess is inclined to be wider as approaching an opening side of the recess. With this, the antireflection film is more likely to be formed normally on the lens part.

A ferrule body may include the holding part and an opening surface in which the holding part is opened; and a lens plate including the recess and the lens array, wherein a filling recessed part (i.e., "filling recess") is formed in at least one of the ferrule body and the lens plate; and due to the filling recessed part, a gap being a matching material filling part that is filled with a refractive index matching material is formed between the opening surface of the ferrule body and an abutment surface of the lens plate. With this, polishing of the ferrule endface and the light guide end surface (fiber endface) is not required.

The ferrule structure may include at least two lens arrays each corresponding to the lens array, and the groove part is formed on each of outer sides of the at least two lens arrays. With this, adhesion of a water droplet to the lens can be suppressed.

The ferrule structure may include at least two lens arrays, wherein the at least two lens arrays are arranged to be aligned in a direction in which the plurality of lens parts forming the lens array are aligned; and the groove part is formed between the at least two lens arrays. A water droplet can flow through the groove part formed between the two lens arrays, and hence adhesion of a water droplet to the lens part can be suppressed.

The groove part may be formed on an outer side of the base surface that is common and has the at least two lens arrays formed. With this, adhesion of a water droplet between the lens arrays can be suppressed.

Figure 1B:
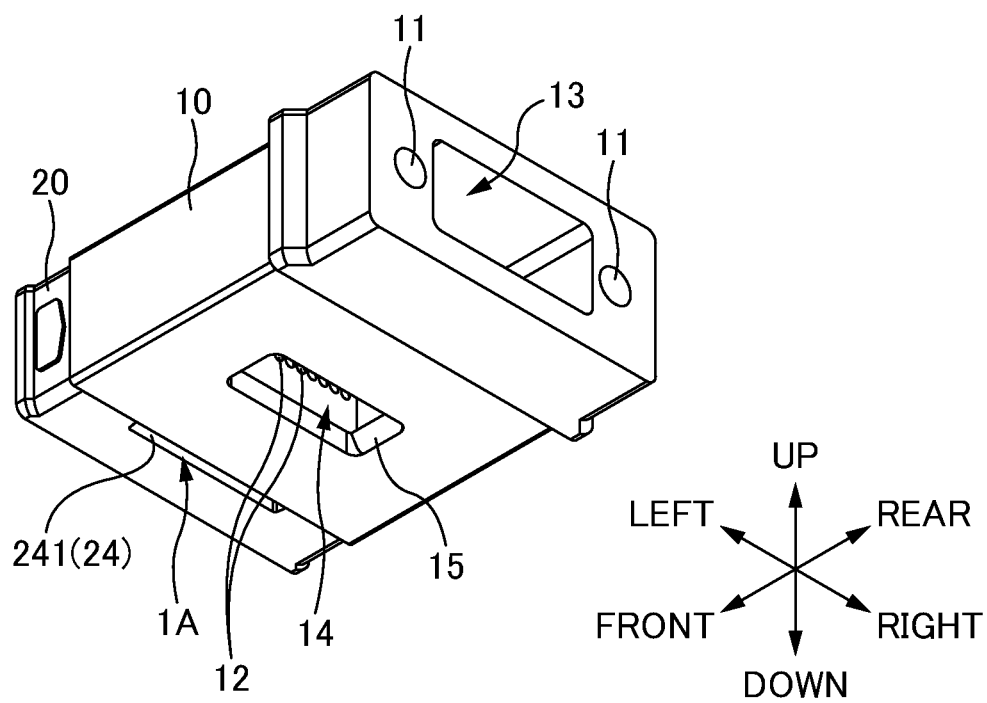
Figure 2A:
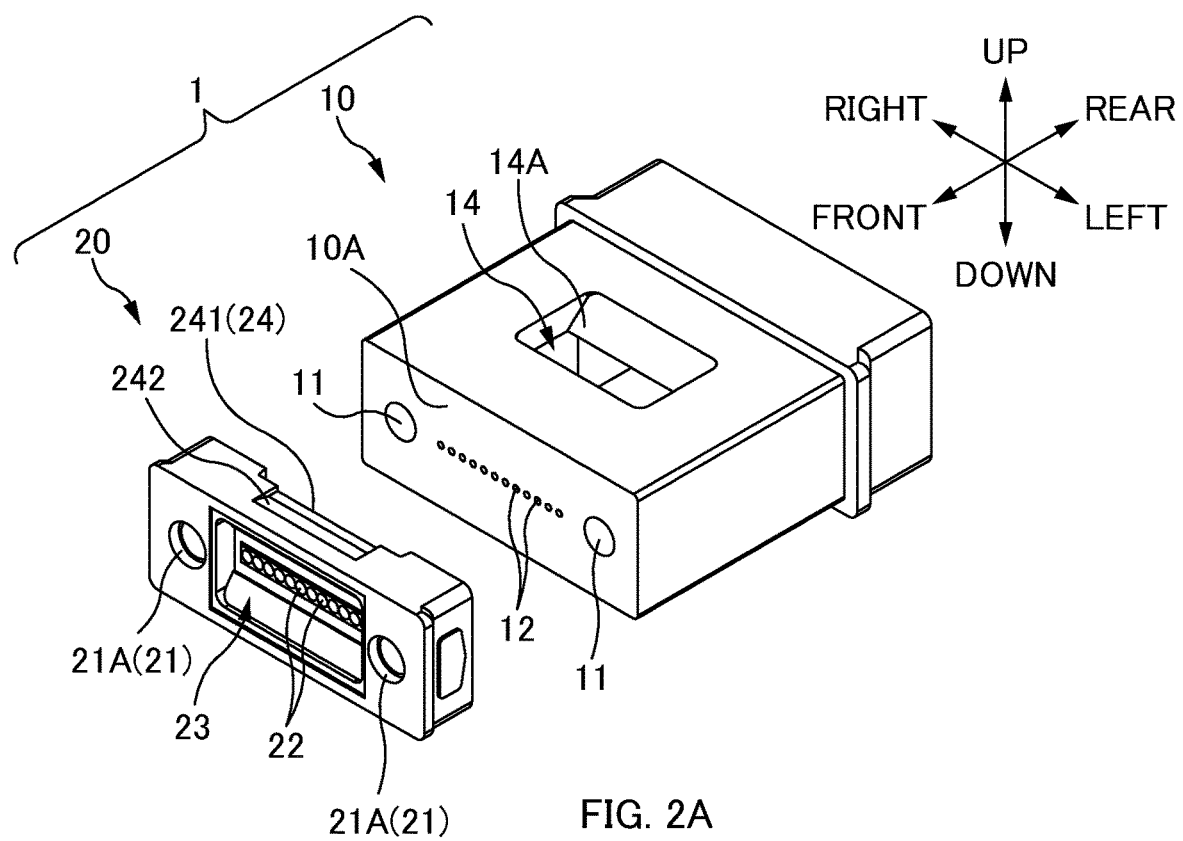
FIG. 2A and FIG. 2B are exploded perspective views of the ferrule structure 1 according to one or more embodiments.
Figure 2B:
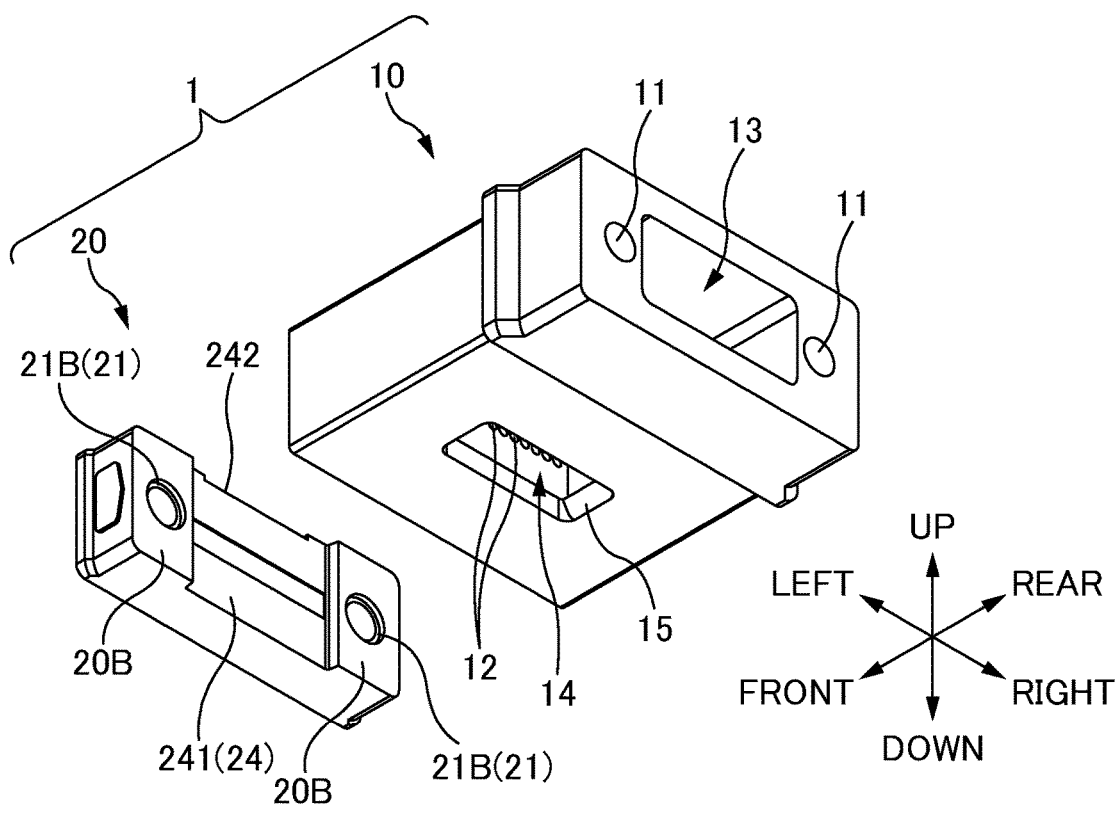
Figure 3:
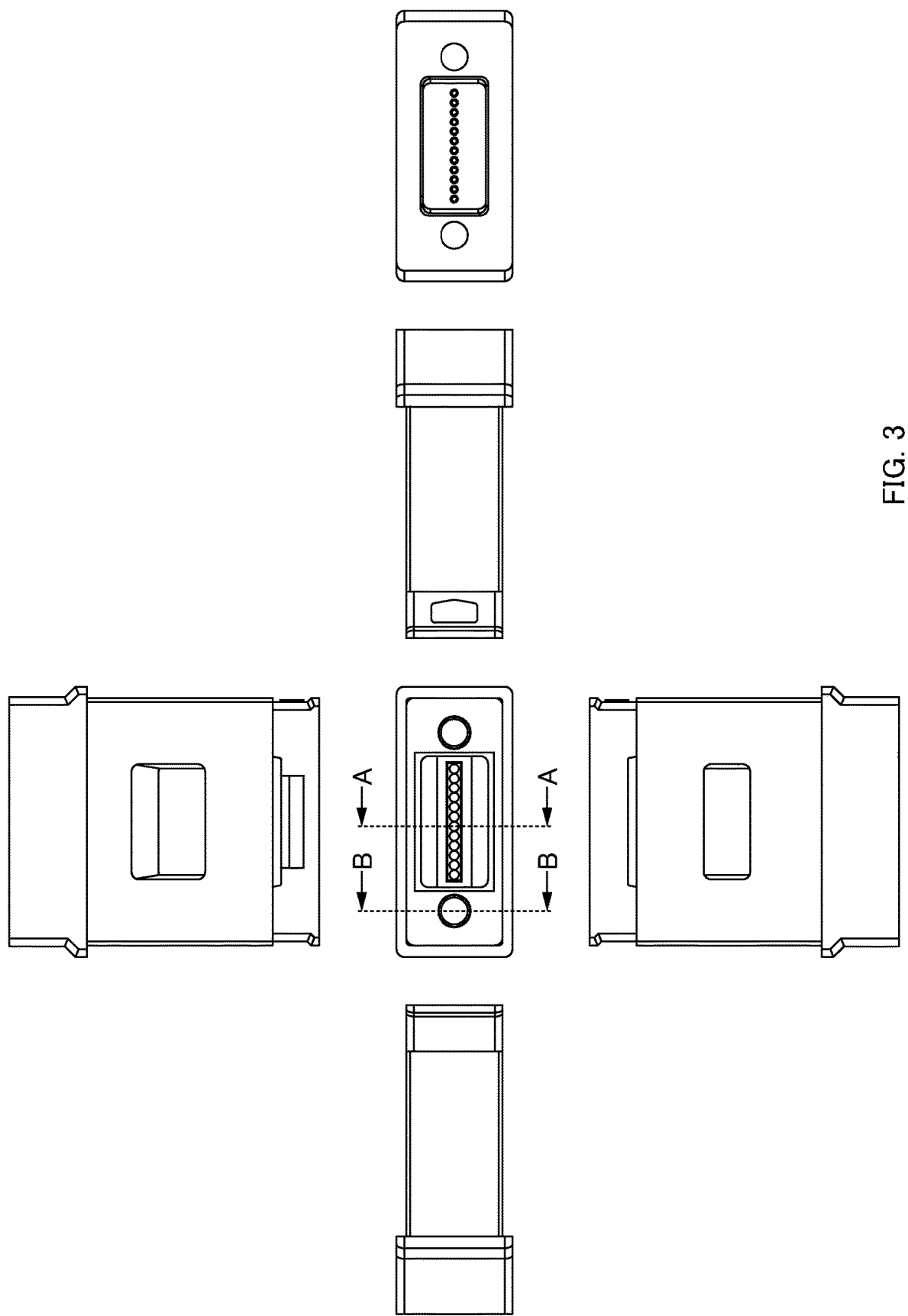
FIG. 3 is a six-side view of the ferrule structure 1 according to one or more embodiments (a front view, a back view, a left side view, a right side view, a plan view, and a bottom view).
Figure 6A:
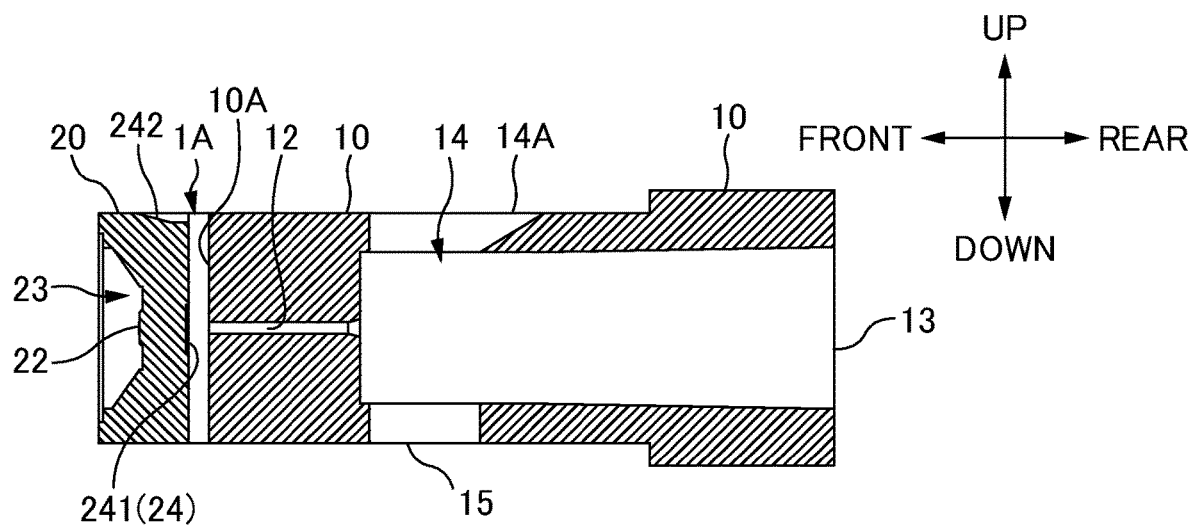
FIG. 6A to FIG. 6C are cross-sectional explanatory views illustrating steps in a method for manufacturing the ferrule structure 1 with a fiber. Note that FIG. 6A is a cross-sectional view taken along the line A-A illustrated in FIG. 3.
Figure 7A:
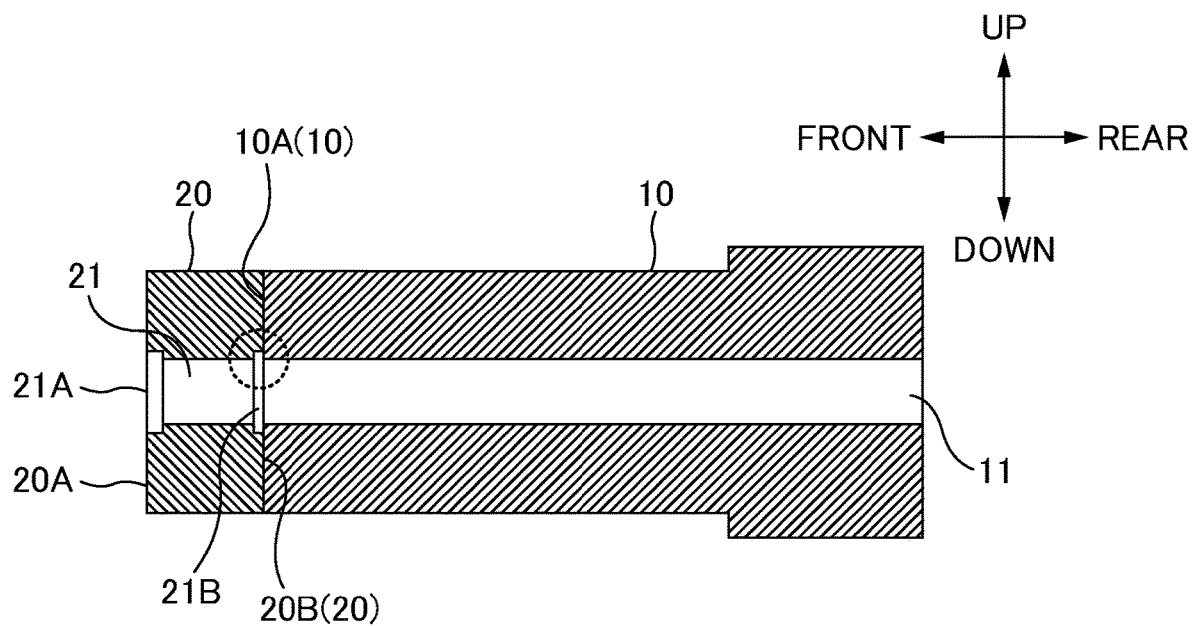
FIG. 7A is a cross-sectional view taken along the line B-B illustrated in FIG. 3, and is a cross-sectional view of the ferrule structure 1, which illustrates a body-side guide hole 11 and a plate-side guide hole 21.

Configuration:

FIG. 1A and FIG. 1B are general perspective views of a ferrule structure 1 according to one or more embodiments. FIGS. 2A and 2B are exploded perspective views of the ferrule structure 1 according to one or more embodiments. FIG. 3 is a six-side view of the ferrule structure 1 according to one or more embodiments (a front view, a back view, a left side view, a right side view, a plan view, and a bottom view). Note that the cross-sectional view taken along the line A-A illustrated in FIG. 3 is illustrated in FIG. 6A. Further, the cross-sectional view taken along the line B-B illustrated in FIG. 3 is illustrated in FIG. 7A.

In the following description, directions will be defined as illustrated in the drawings. Specifically, a direction to fiber holes 12 (or an optical axis direction of optical fibers 3 inserted into the fiber holes 12 (see FIG. 6B and FIG. 6C)) is a "front-rear direction", a mating ferrule side (not illustrated) when seen from the ferrule structure 1 is "front, and an opposite side is "rear". Further, a direction in which two guide holes are aligned is a "left-right direction", a right side when the front side is seen from the rear side is "right", and an opposite side is "left". Further, a direction perpendicular to the front-rear direction and the left-right direction is an "up-down direction", an opening side (filling port 14A) for filling an adhesive in an adhesive filling part 14 is "up", and an opposite side is "down".

The ferrule structure 1 is a member for holding an end part of the optical fiber 3 and optically connecting the optical fiber 3 to another optical component. The ferrule structure 1 may be simply referred to as a "ferrule". The ferrule structure 1 includes a ferrule body 10 and a lens plate 20. In one or more embodiments, the ferrule body 10 and the lens plate 20 that form the ferrule structure 1 are formed as separate members.

Figure 4:
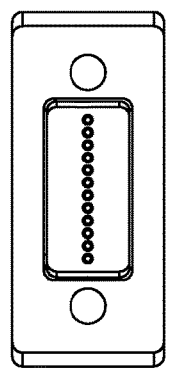
FIG. 4 is a six-side view of a ferrule body 10.
Figure 4:
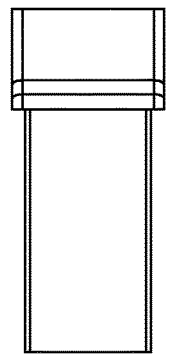
Figure 4:
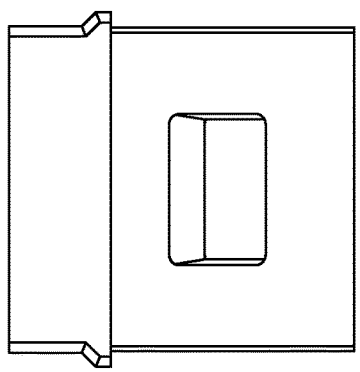
Figure 4:
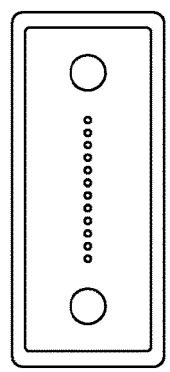
Figure 4:
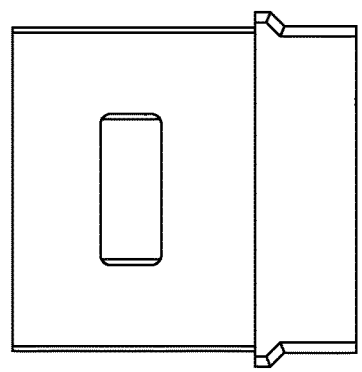
Figure 4:
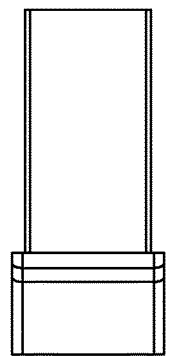

FIG. 4 is a six-side view of the ferrule body 10. Now, with reference to FIG. 1A to FIG. 4, the configuration of the ferrule body 10 is described.

The ferrule body 10 is a member that holds the end part of the optical fiber 3. The ferrule body 10 includes body-side guide holes 11, the fiber holes 12 (holding parts), a fiber insertion opening 13, the adhesive filling part 14, and an air vent hole 15.

Note that, the ferrule body 10 has a configuration substantially similar to that of a mechanically transferable (MT) optical connector (F12 optical connector established by JIS C5981), for example. However, while a ferrule endface and an optical fiber endface are polished in a normal MT optical connector, an optical fiber endface protrudes from a front end surface 10A of the ferrule body 10 (opening surface of the fiber hole 12) and a ferrule endface and the optical fiber endface are not polished in one or more embodiments, as described later. Further, while a fiber end surface is exposed from the ferrule endface in the normal MT optical connector, the optical fiber endface according to one or more embodiments is not exposed to the outside because the lens plate 20 is arranged on a front side of the ferrule body 10 and the optical fiber endface abuts the lens plate 20. Note that, in one or more embodiments, the front end surface 10A of the ferrule body 10 functions as an adhesion surface that adheres to a rear end surface 20B of the lens plate 20.

Each of the body-side guide holes 11 is a hole for inserting a guide pin (not illustrated). As described later, the body-side guide holes 11 are also used for aligning the ferrule body 10 with the lens plate 20. The body-side guide holes 11 penetrate the ferrule body 10 along the front-rear direction. Two body-side guide holes 11 are opened in the front end surface 10A of the ferrule body 10. The two body-side guide holes 11 are arranged at an interval in the left-right direction so as to sandwich a plurality of the fiber holes 12 in the left-right direction. The body-side guide holes 11 and plate-side guide holes 21 of the lens plate 20 form guide holes of the ferrule structure 1.

Figure 6B:
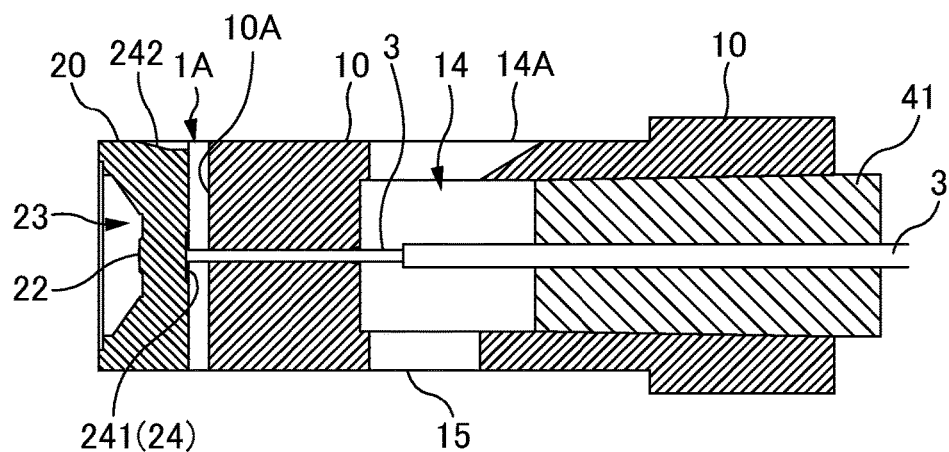
Figure 6C:
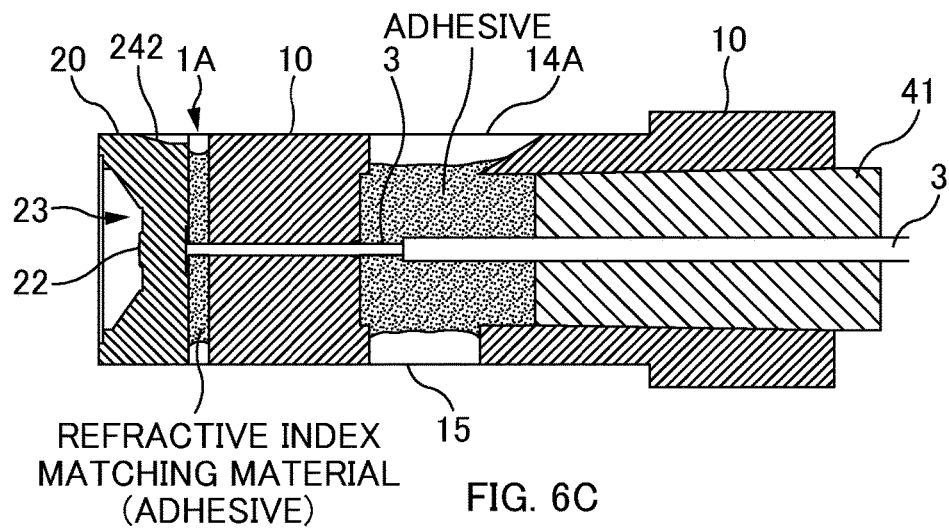

The fiber holes 12 are holes for forming holding parts that hold the optical fibers 3 (see FIG. 6B and FIG. 6C). The optical fibers 3 are inserted into the fiber holes 12, and bonded and fixed, and thus the optical fibers 3 are held in the fiber holes 12. The fiber holes 12 are also holes for aligning the optical fibers 3. Thus, the fiber holes 12 are highly precisely formed with respect to the body-side guide holes 11. The fiber holes 12 penetrate between the front end surface 10A and the adhesive filling part 14. The fiber holes 12 are opened in the front end surface 10A of the ferrule body 10. A bare optical fiber in which a sheath is removed from a secondary coated optical fiber is inserted into each fiber hole 12. The fiber holes 12 are formed along the front-rear direction.

The plurality of fiber holes 12 are formed in the ferrule body 10. The plurality of fiber holes 12 are aligned in the left-right direction. The optical fibers 3 constituting an optical fiber tape (optical fiber ribbon) are each inserted into respective fiber holes 12 aligned in the left-right direction. In one or more embodiments, one column of the fiber holes 12 aligned in the left-right direction is provided. The fiber holes 12 may be in one column or a plurality of columns.

Note that, in one or more embodiments, the optical fibers 3 form light guides, the plurality of optical fibers 3 (or optical fiber tapes) form light guide members forming a plurality of light guides, and the plurality of fiber holes 12 form holding parts that hold the light guide members. However, the light guides are not limited to the guides formed by the optical fibers 3. For example, a plurality of guide paths (light transmission paths) may be formed in a sheet-like or plate-like light guide member. In this case, in place of the plurality of fiber holes 12, the holding parts may be formed by a hole into which the sheet-like or plate-like light guide member can be inserted.

The fiber insertion opening 13 is an opening formed in a rear end surface of the ferrule body 10. The optical fibers 3 (see FIG. 6B and FIG. 6C) are inserted into the ferrule body 10 through the fiber insertion opening 13. A boot 41 (see FIGS. 6B and 6C) is inserted into the fiber insertion opening 13 in some cases, and thus the fiber insertion opening 13 may be referred to as a "boot hole".

The adhesive filling part 14 is a hollow part to be filled with an adhesive. An adhesive for keeping the optical fibers 3 in the ferrule body 10 fills the adhesive filling part 14. An upper side of the adhesive filling part 14 is opened, and the filling port 14A is thus formed. The adhesive fills the adhesive filling part 14 through the filling port 14A, and thus is applied between inner wall surfaces of the adhesive filling part 14 and the fiber holes 12 and the optical fibers 3. This adhesive is cured to fix the optical fibers 3 to the ferrule body 10.

The air vent hole 15 is a hole formed in a lower surface of the ferrule body 10. The air vent hole 15 has a function of releasing an air inside the adhesive filling part 14 to the outside of the ferrule body 10. Thus, the air vent hole 15 is formed as a through hole that passes through to communicate the inside of the adhesive filling part 14 and the outside of the ferrule body 10. The air vent hole 15 according to one or more embodiments has a rectangular shape as seen from below, but may have a circular shape. Further, a plurality of air vent holes 15 may be formed. The air vent hole 15 may have such a size that air can pass therethrough but the adhesive does not leak due to surface tension of the adhesive. Note that the air vent hole 15 may not be formed.

Figure 5:
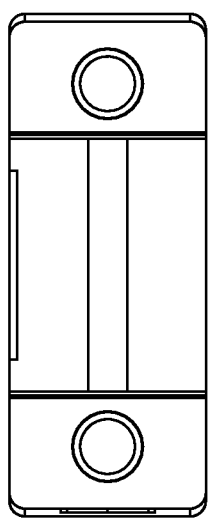
FIG. 5 is a six-side view of a lens plate 20.
Figure 5:
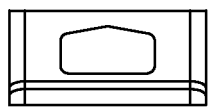
Figure 5:
Figure 5:
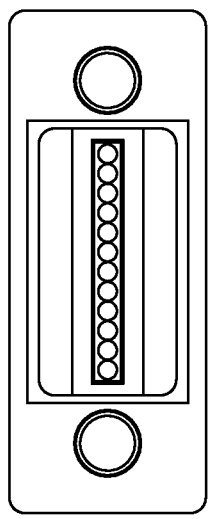
Figure 5:
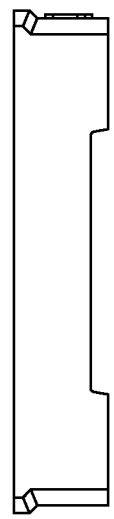
Figure 5:
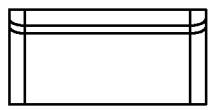

FIG. 5 is a six-side view of the lens plate 20. Now, with reference to FIG. 1A to FIG. 3 and FIG. 5, the configuration of the lens plate 20 is described.

The lens plate 20 is an optical member including a lens array in which a plurality of lenses are aligned. The lens plate 20 is molded from transparent resin that allows transmission of an optical signal. The lens plate 20 is arranged on the front side of the ferrule body 10 while the rear end surface 20B of the lens plate 20 is in contact with the front end surface 10A of the ferrule body 10. Note that, in one or more embodiments, the rear end surface 20B of the lens plate 20 functions as an adhesion surface that adheres to the front end surface 10A of the ferrule body 10. The lens plate 20 includes the plate-side guide holes 21, a lens part 22, a recess 23, and a filling recessed part 24.

Each of the plate-side guide holes 21 is a hole for insertion of a guide pin (not illustrated). The guide pin is inserted into each of the plate-side guide holes 21, and thus ferrule structures 1 are aligned with each other. Note that, as described later, the plate-side guide hole 21 is also used for aligning the ferrule body 10 with the lens plate 20. Thus, an interval between the two plate-side guide holes 21 is the same as an interval between the two body-side guide holes 11 of the ferrule body 10. The plate-side guide holes 21 penetrate the lens plate 20 along the front-rear direction. The two plate-side guide holes 21 are opened in each of a front end surface 20A and the rear end surface 20B of the lens plate 20. A front recessed part 21A and a rear recessed part 21B are formed at the end parts of the plate-side guide holes 21 in the front-rear direction. The front recessed part 21A and the rear recessed part 21B are described later.

The lens part 22 is arranged so as to correspond to each of the plurality of optical fibers 3 (in other words, the plurality of fiber holes 12), and an optical signal is input and output via the lens part 22. Thus, the lens part 22 is highly precisely formed with respect to the plate-side guide holes 21. The lens part 22 is formed so as to function as, for example, a collimating lens. A transmission loss of an optical signal can be suppressed by inputting and outputting the optical signal having a diameter magnified by the lens part 22. The lens part 22 is formed on the front end surface 20A side of the lens plate 20 and formed in the front end surface 20A of the ferrule structure 1. The lens part 22 is formed in the recess 23 of the lens plate 20 so that the convex lens parts 22 do not contact each other when the ferrule structures 1 face and abut each other. The detailed configuration of the lens part 22 and the recess 23 are described later.

The filling recessed part 24 is a part for forming a gap between the opening surface of the fiber hole 12 (the opening surface of the holding part) of the ferrule body 10 and an abutment surface 241 (abutment surface 241 for abutment of the optical fiber endface being an end surface of the light guide) of the lens plate 20. In one or more embodiments, the filling recessed part 24 is formed in the rear end surface 20B of the lens plate 20. In other words, in one or more embodiments, the filling recessed part 24 is a part recessed from the rear end surface 20B of the lens plate 20. However, a filling recessed part may be formed in the front end surface 10A of the ferrule body 10. A bottom surface of the filling recessed part 24 is the abutment surface 241 for abutment of the optical fiber endface. Thus, when the lens plate 20 is attached to the ferrule body 10 via the guide pins (not illustrated) (described later), the bottom surface of the filling recessed part 24 being the abutment surface 241 faces the opening of the fiber hole 12 of the ferrule body 10. Note that a width of the bottom surface of the filling recessed part 24 in the left-right direction is longer than a width of the column of the fiber holes 12 aligned in the left-right direction (longer than a width of the optical fiber tape).

The filling recessed part 24 is formed in the lens plate 20, and thus a gap is formed between the lens plate 20 and the ferrule body 10, and a matching material filling part 1A is formed by the gap. In one or more embodiments, the filling recessed part 24 is formed from an upper surface to a lower surface of the lens plate 20. Thus, the matching material filling part 1A is opened in the upper surface and the lower surface of the ferrule structure 1.

The matching material filling part 1A is a hollow part for filling a refractive index matching material. The matching material filling part 1A is filled with an adhesive including a function as a refractive index matching material, but an adhesive may not be used as long as a refractive index matching material is used. The matching material filling part 1A is formed to be longer in the left-right direction than a width of the optical fiber tape (optical fiber ribbon).

An upper opening of the matching material filling part 1A includes a function as an input port for inputting a refractive index matching material to the matching material filling part 1A. A lower opening of the matching material filling part 1A includes a function as an air vent for ventilation between the matching material filling part 1A and the outside. Note that the lower side of the matching material filling part 1A may not be opened, and only the upper side thereof may be opened. However, in this case, a refractive index matching material is more likely to build up on the upper side of the optical fibers 3. As a result, the refractive index matching material is less likely to reach a bottom surface of the matching material filling part 1A, and an air bubble is more likely to be formed in the matching material filling part 1A (thus, an air layer (air bubble) is more likely to be formed on the endface of the optical fiber 3, and a loss of an optical signal may be increased).

A reception part 242 is formed at an upper edge of the filling recessed part 24. The reception part 242 is a part for widening the opening of the matching material filling part 1A. The reception part 242 is formed at the opening of the matching material filling part 1A, and thus an operation of filling a refractive index matching material in the matching material filling part 1A is facilitated. Further, when an excessive refractive index matching material is input to the matching material filling part 1A, the excessive amount of the refractive index matching material stays in the reception part 242, and hence the refractive index matching material can be prevented from overflowing from the upper side of the matching material filling part 1A.

Further, as in one or more embodiments, the filling recessed part 24 is formed from the upper surface to the lower surface of the lens plate 20, and the matching material filling part 1A is configured to be opened in the upper surface and the lower surface of the ferrule structure 1. Thus, the matching material filling part 1A has a substantially vertically symmetrical structure. This results in an advantage that deformation such as a warp in the ferrule structure 1 can be suppressed when a refractive index matching material (adhesive) filling the matching material filling part 1A is cured and contracts. Note that, in a case where the matching material filling part 1A is opened only on the upper side, when a refractive index matching material (adhesive) is cured and contracts, deformation occurs on the upper side on which the matching material filling part 1A is opened in such a way as to reduce the gap between the ferrule body 10 and the lens plate 20, and deformation does not occur on the lower side. As a result, deformation may occur in such a way that the ferrule structure 1 is warped.

Figure 7B:
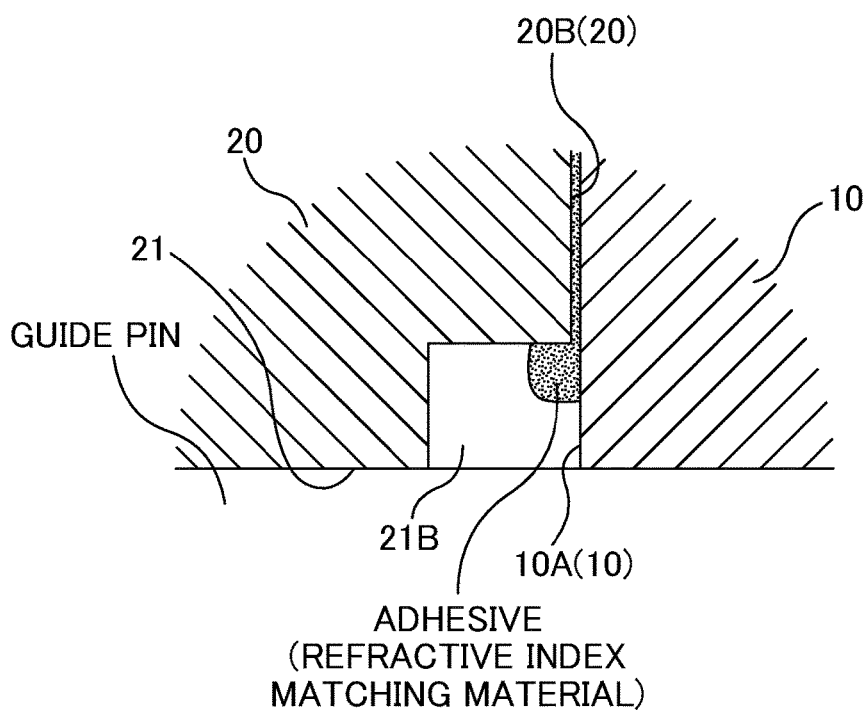
FIG. 7B is an enlarged cross-sectional view in the vicinity of a rear recessed part 21B under a state in which a guide pin is inserted. Note that FIG. 7A is a cross-sectional view taken along the line B-B illustrated in FIG. 3.

Regarding Front Recessed Part 21A and Rear Recessed Part 21B:

FIG. 7A is a cross-sectional view taken along the line B-B illustrated in FIG. 3, and is a cross-sectional view of the ferrule structure 1, which illustrates the body-side guide hole 11 and the plate-side guide hole 21. FIG. 7B is an enlarged cross-sectional view in the vicinity of the rear recessed part 21B. Note that FIG. 7B is an enlarged view of the region circled with the dot line in FIG. 7A under a state in which the guide pin is inserted into the body-side guide hole 11 and the plate-side guide hole 21.

An adhesive is applied (or permeates through) between the front end surface 10A of the ferrule body 10 and the rear end surface 20B of the lens plate 20. With this, the ferrule body 10 and the lens plate 20 are bonded and fixed. The surfaces including the front end surface 10A and the rear end surface 20B to which the adhesive is applied function as adhesion surfaces. When the ferrule body 10 and the lens plate 20 are bonded and fixed, the guide pins are inserted into both the body-side guide holes 11 of the ferrule body 10 and the plate-side guide holes 21 of the lens plate 20, and hence the ferrule body 10 and the lens plate 20 are aligned.

At this state, when the adhesive leaks in any of the body-side guide holes 11 and the plate-side guide holes 21, there may be a possibility in that the adhesive may adhere to the guide pin and the guide pin cannot be pulled out. In particular, the gap between the body-side guide hole 11 and the plate-side guide hole 21, and the guide pin is fine, and thus the adhesive is more likely to permeate along the surface of the guide pin by capillarity. Thus, when the adhesive adheres to the guide pin, the guide pin is less likely to be pulled out. In view of this, in one or more embodiments, in order to prevent the adhesive from adhering to the guide pin, the rear recessed part 21B is formed in each plate-side guide hole 21.

The rear recessed part 21B is a recessed part (counter-bored part) formed in the rear end of the plate-side guide hole 21. That is, the rear recessed part 21B is a recessed part formed in the rear end surface 20B of the lens plate 20 to which the adhesive is applied. The rear recessed part 21B is formed in the periphery of the opening of the plate-side guide hole 21 of the rear end surface 20B. With this, as illustrated in FIG. 7B, even when the adhesive leaks from the gap between the front end surface 10A of the ferrule body 10 and the rear end surface 20B of the lens plate 20, the adhesive can be prevented from adhering to the guide pin.

A diameter of the plate-side guide hole 21 (and the body-side guide hole 11) is 0.7 mm (a standard value, a diameter of the guide pin is 0.699 mm), more specifically, from 0.699 mm to 0.701 mm. With respect to this, a diameter of the rear recessed part 21B is set to 0.8 mm, 0.9 mm, and 1.0 mm, and a depth of the rear recessed part 21B is set to 0.03 mm, 0.1 mm, and 0.2 mm. Then, a probability that the adhesive for bonding the ferrule body 10 and the lens plate 20 adheres to the guide pin is confirmed. The probability that the adhesive adheres to the guide pin is as shown in Table 1 given below.

TABLE 1

| | | DEPTH(mm) | | |
| --- | --- | --- | --- | --- |
| | | 0.03 | 0.1 | 0.2 |
| DIAMETER | 0.8 | 100% | 80% | 90% |
| (mm) | 0.9 | 80% | 10% | 0% |
| | 1 | 80% | 10% | 10% |

As shown in the results in Table 1, the diameter of the rear recessed part 21B may be 0.9 mm or more. Note that the diameter of the plate-side guide hole 21 (and the body-side guide hole 11) may be 0.55 mm. In this case, the diameter of the rear recessed part 21B may be 0.75 mm or more. As described above, the diameter of the rear recessed part 21B may be larger than the diameter of the plate-side guide hole 21 (and the body-side guide hole 11) by 0.2 mm or more. Further, the depth of the rear recessed part 21B may be 0.1 mm or more. Further, the rear recessed part 21B may have a diameter of 0.9 mm or more and a depth of 0.1 mm or more.

Incidentally, attachment and detachment of the ferrule structure 1 according to one or more embodiments and the mating ferrule are repeated, and fitting of the guide pin and the plate-side guide hole 21 is repeated. Thus, abrasion powder may adhere to the guide pin or the plate-side guide hole 21. When powder dust such as abrasion powder described above adheres to a connecting endface of the ferrule structure 1 (in this case, the front end surface 20A of the lens plate 20), the abrasion powder enters the gap between the mating ferrule and the connecting endface, which increases a transmission loss. In view of this, in one or more embodiments, the front recessed part 21A is formed in each plate-side guide hole 21.

The front recessed part 21A is a recessed part (counterbored part) formed in the front end of the plate-side guide hole 21. In other words, the front recessed part 21A is a recessed part formed in the front end surface 20A being a connecting endface of the ferrule structure 1. When the front recessed part 21A is formed in the periphery of the opening of the plate-side guide hole 21 of the front end surface 20A, powder dust such as abrasion powder can enter the gap between the guide pin and the front recessed part 21A, and hence powder dust can be prevented from entering the gap between the mating ferrule and the connecting endface.

Figure 8:
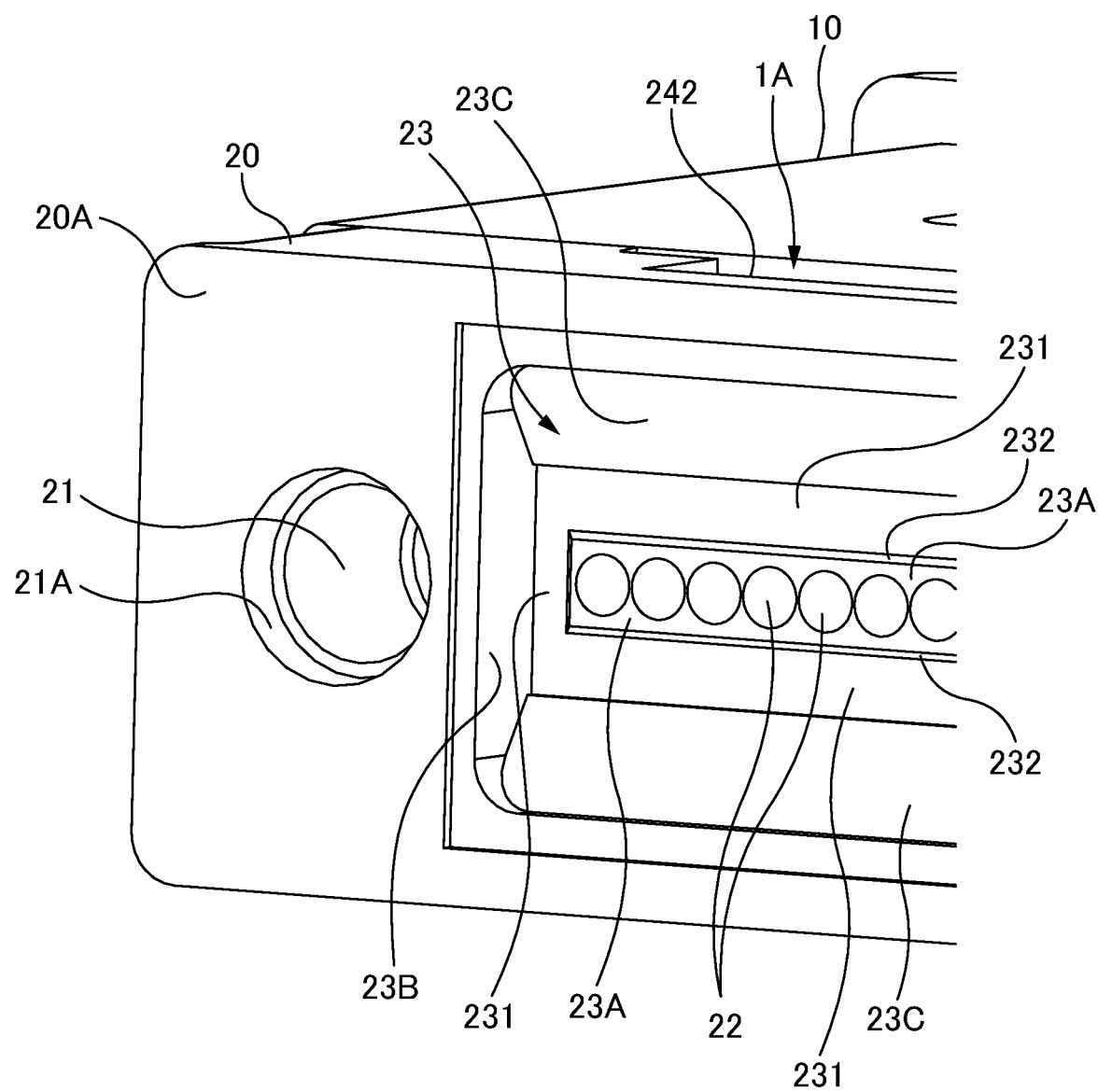
FIG. 8 is an enlarged perspective view illustrating a configuration of a lens part 22 and a recess 23.
Figure 9:
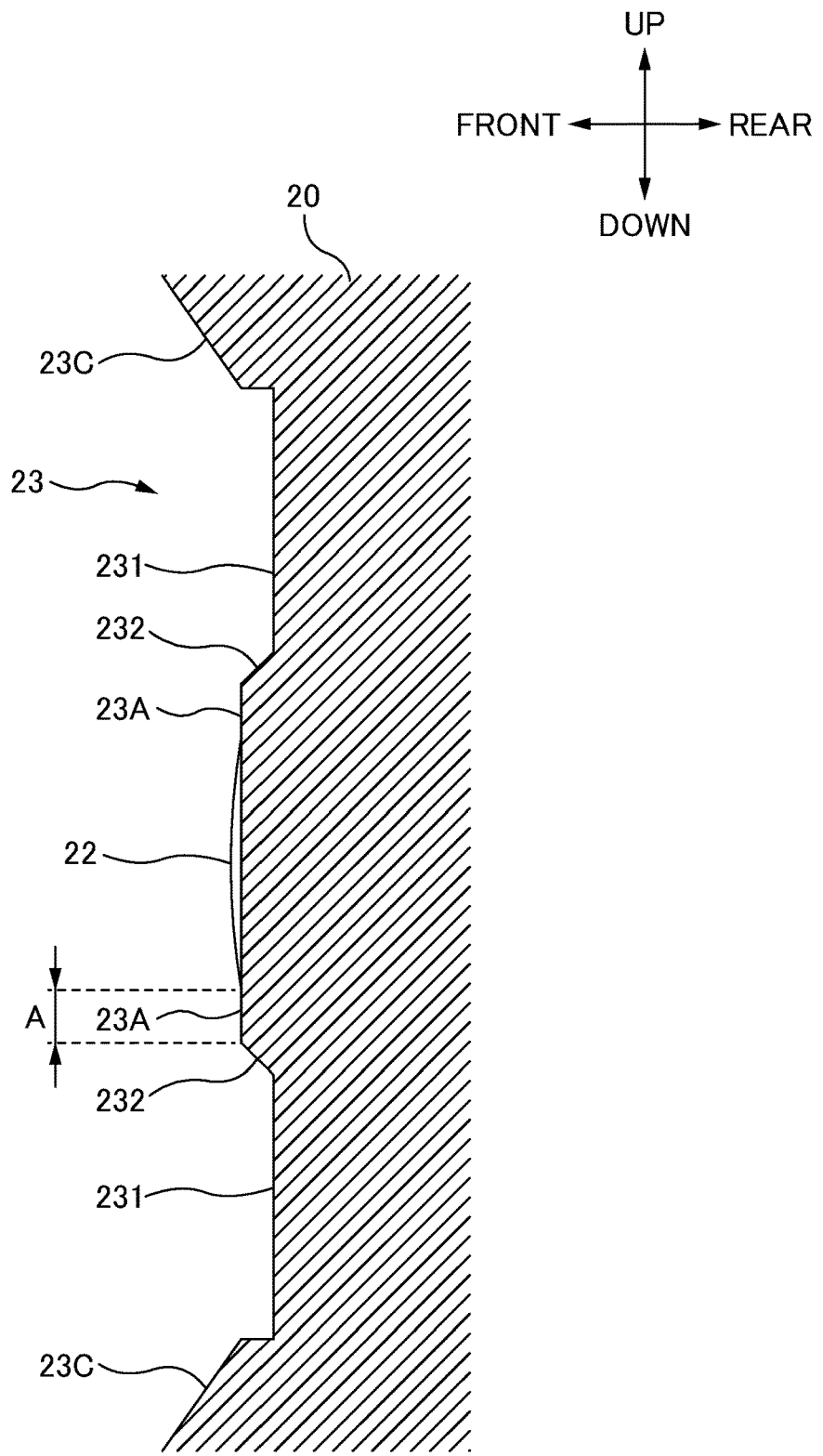
FIG. 9 is a cross-sectional view of the lens part 22.

Regarding Lens Part 22 and Recess 23:

FIG. 8 is an enlarged perspective view illustrating the configuration of the lens part 22 and the recess 23. FIG. 9 is a cross-sectional view of the lens part 22.

The front end surface of the ferrule structure 1 is a connecting endface with respect to the mating ferrule (not illustrated). Herein, the front end surface of the ferrule structure 1 is the front end surface 20A of the lens plate 20. The recess 23 is formed in the front end surface 20A of the ferrule structure 1. The recess 23 is a part recessed from the connecting endface with respect to the mating ferrule (not illustrated). A lens array formed with the plurality of lens parts 22 is formed on a base surface 23A being a bottom surface of the recess 23. Each lens part 22 protrudes in a convex shape from the flat base surface 23A, and the lens part 22 is formed in the recess 23. Thus, the convex lens part 22 is formed so as not to contact with the lens parts of the mating ferrule.

Incidentally, when the ferrule structure 1 is used under high-temperature and high-humidity environment, a water droplet adheres to the ferrule structure 1 in some cases. The recess 23 is a recessed part. Thus, when a water droplet is generated in an inner side of the recess 23, the water droplet is less likely to be discharged from the recess 23 to the outside, and is more likely to stay in the inner side of the recess 23. When such water droplet adheres to the lens part 22, light is dispersed, and a transmission loss is increased. Further, when the water droplet is evaporated under a state in which the water droplet adheres to the lens part 22, a water scale is formed on the lens part 22 in some cases, and there may be a possibility in that light is dispersed due to the water scale. Thus, adhesion of a water droplet to the lens part 22 may be suppressed. In view of this, in one or more embodiments, a groove part 231 is formed on an outer side of the lens array.

The groove part 231 is a part recessed from the base surface 23A. When seen from the bottom surface of the groove part 231, the base surface 23A having the lens part 22 formed thereon protrudes frontward. The groove part 231 is formed on the outer side of the lens array so as to surround the lens array (the plurality of lens parts 22). With regard to the groove part 231 described herein, the groove part 231 extending in the left-right direction is provided on each of the upper side and the lower side of the lens array in which the plurality of lens parts 22 are aligned in the left-right direction. The groove part 231 is a part recessed from the base surface 23A. Thus, when the groove part 231 is provided, the space in the periphery of the lens array is increased. Further, in one or more embodiments, a water droplet enters the space increased by the groove part 231, and thus adhesion of the water droplet to the lens part 22 can be suppressed as compared to the case without the groove part 231.

In one or more embodiments, as illustrated in FIG. 8, the groove part 231 is also formed between the lens part 22 at an end part of the lens array and a side wall surface 23B of the recess 23. In the drawing, illustration is given in which the groove part 231 is formed at the right side of the lens part 22 at the rightmost end, and between the side wall surface 23B and the lens part 22. A water droplet generated in the recess 23 is more likely to stay under a state of adhering to the side wall surface 23B due to surface tension, and is particularly more likely to adhere to the lens part 22 at the end part. Thus, by arranging the groove part 231 between the lens part 22 at the end part and the side wall surface 23B, increase of a transmission loss at the lens part 22 at the end part to which a water droplet is more likely to adhere particularly can be suppressed, which is particularly advantageous.

As illustrated in FIG. 9, the groove part 231 is recessed from the base surface 23A, and hence step parts are formed between the bottom surface of the groove part 231 and the base surface 23A. Further, in one or more embodiments, step surfaces 232 are inclined. Specifically, the step surface 232 on the upper side of the lens array is inclined so that a normal line (normal line vector) has a frontward component as well as an upward component. Further, the step surface 232 on the lower side of the lens array is inclined so that the normal line has a frontward component as well as a downward component. As described above, the step surfaces 232 are inclined, and hence a water droplet adhering to the base surface 23A is more likely to flow down in the groove part 231. Thus, adhesion of a water droplet to the lens part 22 can be suppressed. However, instead of inclining the step surfaces 232, the step surfaces 232 may be vertical with respect to the base surface 23A and the bottom surface of the groove part 231.

A water droplet adhering to the base surface 23A is more likely to adhere to the edge of the lens part 22 protruding from the base surface 23A in a convex shape, and hence is more likely to stay on the base surface 23A between the edge of the lens part 22 and the groove part 231. However, when water droplets adhering to the adjacent lens parts 22 are joined, the large joined water droplet is more likely to fall down from the base surface 23A into the groove part 231. In view of this, in one or more embodiments, a width A of the base surface 23A (see FIG. 9) between the edge of the lens part 22 and the groove part 231 is set to be a radius of the lens part 22 or smaller. With this, the width of the part of the base surface 23A in which a water droplet is more likely to stay is set to be relatively small, which can promote water droplets adhering to the adjacent lens parts 22 to be joined, and the water droplet adhering to the lens part 22 can fall down from the base surface 23A into the groove part 231. Thus, the water droplet can be prevented from staying on the lens part 22.

Note that, in one or more embodiments, a diameter of the lens part 22 is 240 μm. A part of the lens part 22, which functions as an optical path, has a diameter of from 70 μm to 100 μm. The width A of the base surface 23A (see FIG. 9) between the edge of the lens part 22 and the groove part 231 is 50 μm. A height of the lens part 22 (a dimension from the base surface 23A to the top of the lens part 22) is from 20 μm to 30 μm. A depth of the groove part 231 is approximately several tens of micrometers. However, the dimensions are not limited thereto.

The surface of the lens part 22 is coated with an antireflection film (AR coating) in some cases. Such antireflection film is normally formed on the surface of the lens part 22 by vapor deposition. However, the lens part 22 is arranged on the bottom surface of the recess 23, and hence shadows of the inner wall surfaces of the recess 23 are formed during vapor deposition, which may cause a possibility in that the antireflection film cannot be formed on the surface of the lens part 22 normally. In view of this, in one or more embodiments, inclination surfaces 23C are provided on the upper and lower inner wall surfaces of the recess 23 so as to be wider as approaching the opening side (front side) of the recess 23. With this, the shadows of the inner wall surface of the recess 23 can be prevented from being generated on the lens part 22 during vapor deposition, and the antireflection film can be formed on the lens part 22 normally.

Note that, there is a limit for a volume that a vapor deposition device (coating device) can process at one time, but in one or more embodiments, a target object for vapor deposition is a single lens plate 20. Thus, a number of lens plates 20 can be set to the vapor deposition device, and the antireflection film can be formed on the lens part 22 at low cost.

As described above, the ferrule structure 1 according to one or more embodiments includes the plurality of fiber holes 12, the recess 23, and the lens array formed of the plurality of lens parts 22 arranged correspondingly to the fiber holes 12. Further, in one or more embodiments, the groove part 231 recessed from the base surface 23A having the lens array formed thereon is formed on the outer side of the lens array (see FIG. 8). As described above, by providing the groove part 231, the peripheral space of the lens array is increased. A water droplet enters the space increased by the groove part 231, and thus adhesion of the water droplet to the lens part 22 can be suppressed as compared to the case without the groove part 231.

Figure 10A:
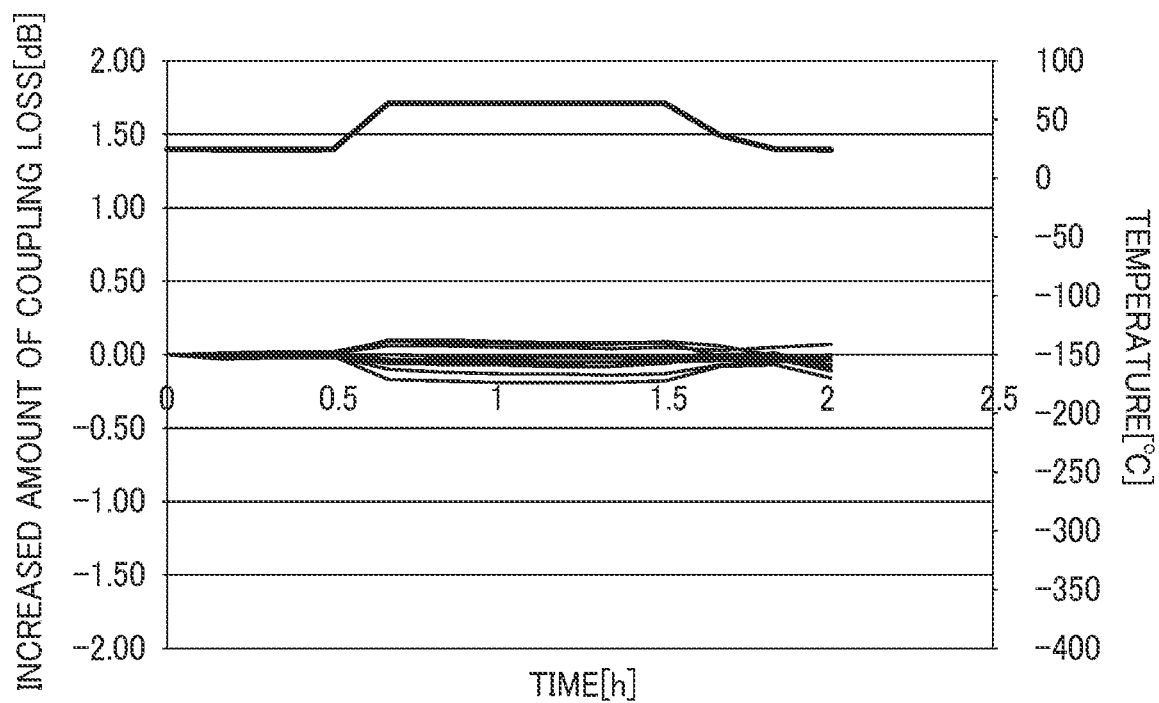
FIG. 10A is a graph showing environment test results in a case of forming a groove part 231 on an outer side of a lens array.
Figure 10B:
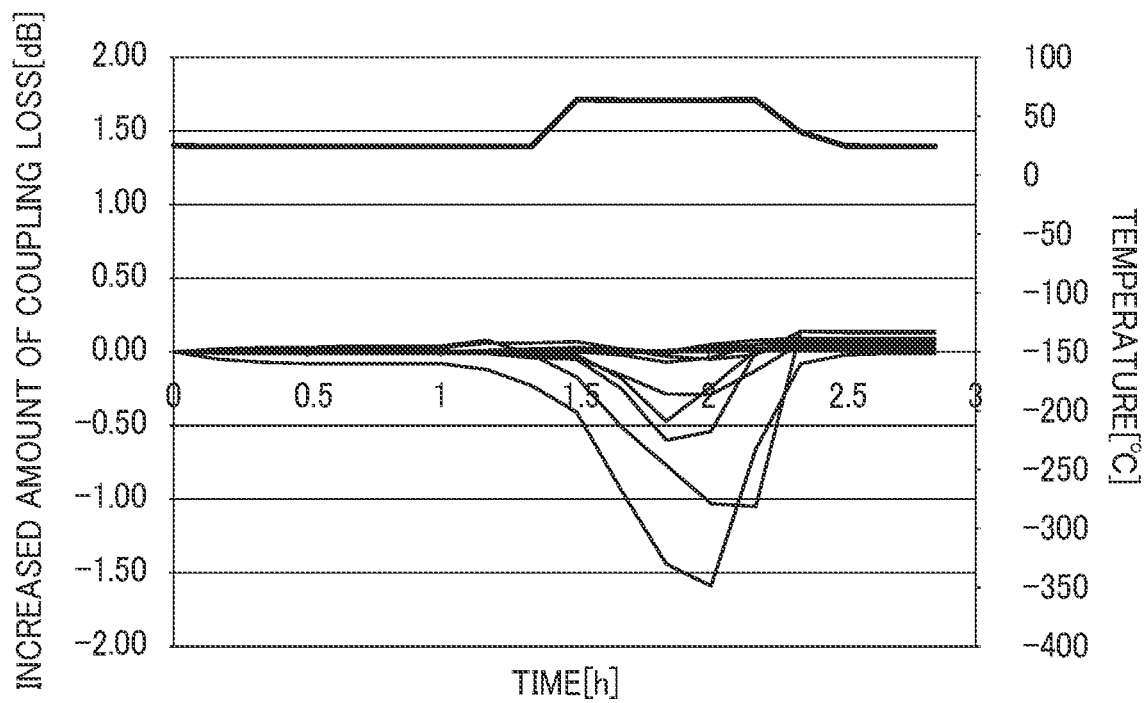
FIG. 10B is a graph showing environment test results in a case without the groove part 231.

FIG. 10A is a graph showing environment test results in a case of forming the groove part 231 on the outer side of the lens array (one or more embodiments described above). FIG. 10B is a graph showing environment test results in a case without the groove part 231. The horizontal axis of each of the graphs indicates a time. The vertical axis of each of the graphs indicates a temperature (degree centigrade). Herein, under environment with humidity of 95% and a temperature changed between 25 degrees and 65 degrees, an increased amount of a coupling loss (dB) of each of twelve optical fibers 3 fixed to the ferrule structure 1 was measured. The vertical axis on the left side of each of the graphs indicates the increased amount of the coupling loss (dB). On the upper side of each of the drawings in FIG. 10A and FIG. 10B, a graph with a bold line indicating the temperature change over time is illustrated. Further, on the lower side of each of the drawings, a graph with twelve fine lines indicating changes of the increased amounts of the coupling losses (dB) of the twelve optical fibers 3 over time is illustrated.

As can be understood from FIG. 10B, under high-temperature and high-humidity environment, degradation of the transmission loss of the optical fiber 3 was confirmed. The reason for this was conceived to be that a water droplet had adhered to the lens part 22 being an optical path under high-temperature and high-humidity environment. Further, as can be understood from comparison between FIG. 10A and FIG. 10B, it was confirmed that, as compared to the case without the groove part 231, when the groove part 231 was formed on the outer side of the lens array the transmission loss of the optical fiber 3 was able to be suppressed. Thus, it was successfully confirmed that forming the groove part 231 on the outer side of the lens array was effective.

Further, in FIG. 10B, particularly, degradation of the transmission loss of the optical fiber 3 at the end part was confirmed. The reason for this was conceived to be that a water droplet was particularly more likely to adhere to the lens part 22 at the end part under high-temperature and high-humidity environment. Thus, arranging the groove part 231 between the lens part 22 at the end part and the side wall surface 23B was particularly effective.

Figure 11:
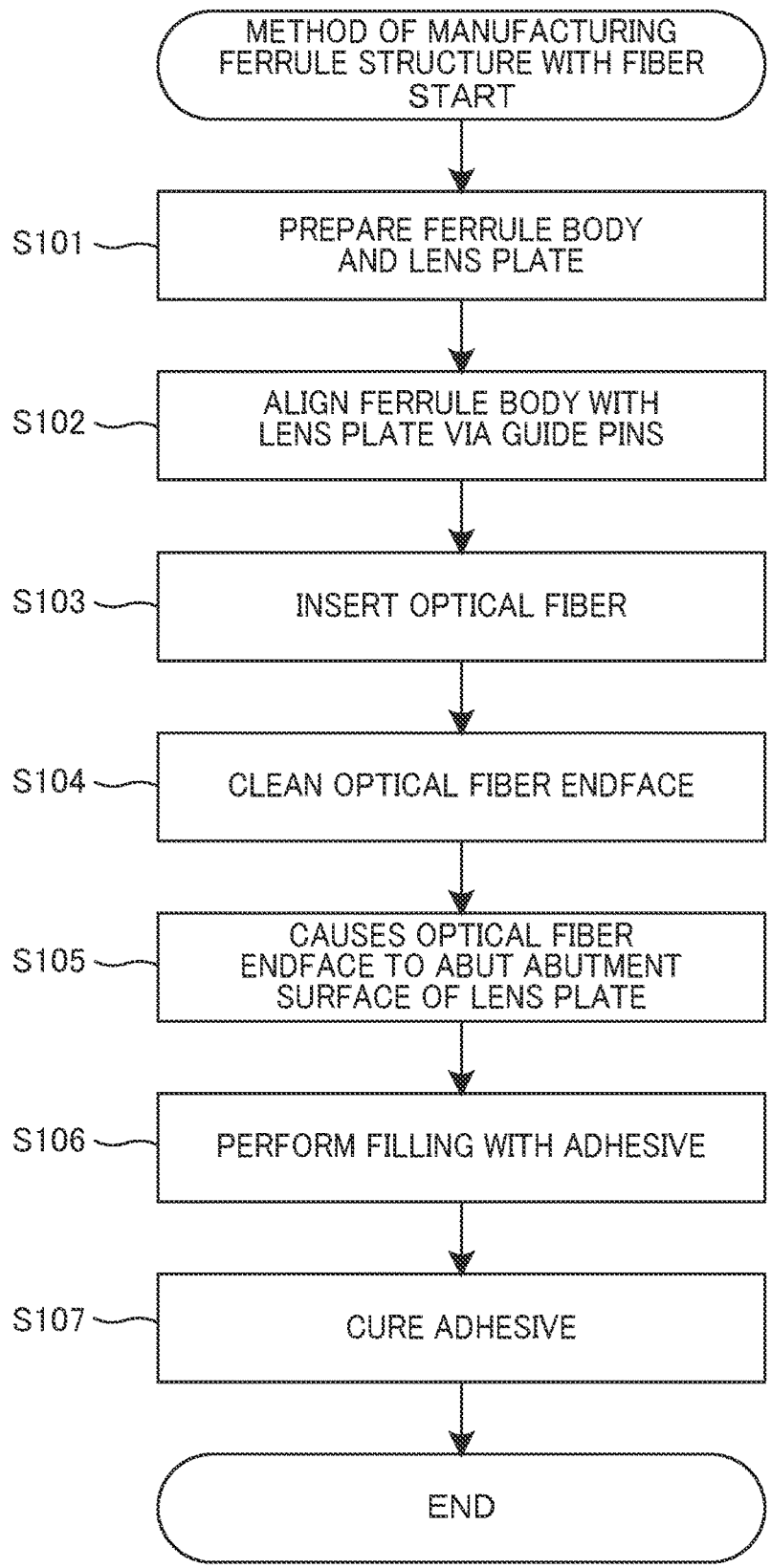
FIG. 11 is a flowchart of a method for manufacturing (a procedure for assembling) the ferrule structure 1 with a fiber.

Method for Manufacturing Ferrule Structure 1 with Fiber (1):

FIG. 11 is a flowchart of a method for manufacturing (a procedure for assembling) the ferrule structure 1 with a fiber. Further, FIG. 6A to FIG. 6C are cross-sectional explanatory views illustrating states of the respective steps.

First, an operator prepares the ferrule body 10 and the lens plate 20 (S101). The operator also prepares the guide pins (not illustrated) for a next step. The operator also prepares a jig for assembling the ferrule body 10 and the lens plate 20 and the like as necessary.

Next, the operator aligns the ferrule body 10 with the lens plate 20 via the guide pins (S102). At this time, the operator inserts each guide pin (not illustrated) into both of the body-side guide hole 11 of the ferrule body 10 and the plate-side guide hole 21 of the lens plate 20. In this way, the ferrule body 10 is aligned with the lens plate 20 in the up-down direction and the left-right direction. Further, the operator brings the front end surface 10A of the ferrule body 10 into contact with the rear end surface 20B of the lens plate 20 while the guide pins are inserted. In this way, the ferrule body 10 is aligned with the lens plate 20 in the front-rear direction. Note that a state where the front end surface 10A of the ferrule body 10 is in contact with the rear end surface 20B of the lens plate 20 may be maintained by placing, on a jig, the ferrule structure 1 in which the ferrule body 10 and the lens plate 20 are attached to each other via the guide pins (not illustrated).

When the ferrule body 10 is aligned with the lens plate 20 in S102, a positional relationship between the ferrule body 10 and the lens plate 20 is in a state illustrated in FIG. 1A and FIG. 6A (note that the guide pins are not illustrated). At this time, a gap is formed between the lens plate 20 and the ferrule body 10 by the filling recessed part 24 of the lens plate 20, and the matching material filling part 1A is formed by the gap. The bottom surface (abutment surface 241) of the filling recessed part 24 of the lens plate 20 faces the openings of the fiber holes 12 of the ferrule body 10.

Next, the operator inserts each of the optical fibers 3 of the optical fiber tape into each of the fiber holes 12 of the ferrule body 10 (S103). Then, the optical fiber 3 protrudes from the front end surface 10A (opening surface of the fiber hole 12) of the ferrule body 10. However, in this stage, the optical fiber endface does not abut the abutment surface 241 (bottom surface of the filling recessed part 24) of the lens plate 20. This is because dust and the like may adhere to the optical fiber endface when the optical fiber 3 passes through the fiber hole 12.

Next, the operator cleans the optical fiber endface (S104). For example, the operator blows air onto the gap of the matching material filling part 1A, and blows off dust adhering to the optical fiber endface protruding from the front end surface 10A of the ferrule body 10. In this way, dust on the optical fiber endface adhering when the optical fiber 3 is inserted into the fiber hole 12 (S103) can be removed. Note that the cleaning processing in S104 is performed before S105 (abutment processing) and S106 (adhesive filling processing) in order to remove dust on the optical fiber endface in such a manner.

Next, the operator further inserts the optical fiber 3, and causes the optical fiber endface to abut the abutment surface 241 of the lens plate 20 (S105). In this stage, strictly speaking, an air layer may exist between the optical fiber endface and the abutment surface 241. Note that, as illustrated in FIG. 6B, the operator inserts the boot 41 into the fiber insertion opening 13 in one or more embodiments. However, the boot 41 may not be inserted into the fiber insertion opening 13.

Next, the operator fills an adhesive (S106).

In the adhesive filling processing in S106, first, the operator fills the adhesive in the adhesive filling part 14 of the ferrule body 10. In this way, the adhesive is applied between the inner wall surface of the adhesive filling part 14 and the optical fiber 3. Further, when the adhesive fills the adhesive filling part 14, the adhesive permeates between the inner wall surface of the fiber hole 12 and the optical fiber 3. When the adhesive sufficiently permeates, the adhesive filling the adhesive filling part 14 leaks from the front end surface 10A (opening of the fiber hole 12) of the ferrule body 10. In one or more embodiments, a leak of the adhesive filling the adhesive filling part 14 from the front end surface 10A (openings of the fiber hole 12) of the ferrule body 10 is visible through a gap of the filling recessed part 24 (matching material filling part 1A) of the lens plate 20. The operator fills an adhesive to be a refractive index matching material in the matching material filling part 1A after recognizing a leak of the adhesive filling the adhesive filling part 14 from the front end surface 10A (opening of the fiber hole 12) of the ferrule body 10. This can suppress an air bubble remaining in the fiber hole 12.

The adhesive filling the adhesive filling part 14 of the ferrule body 10 temporarily stays on the upper side of the optical fibers arranged inside the adhesive filling part 14 of the ferrule body 10 (see FIG. 6B), and reaches the lower side of the optical fibers 3 (between the optical fibers and the bottom surface of the ferrule body 10 forming the adhesive filling part 14) through the gap between the plurality of optical fibers 3 aligned in the left-right direction. In this case, the air vent hole 15 is formed in the lower surface of the adhesive filling part 14, and hence the adhesive that temporarily stays on the upper side of the optical fibers 3 is more likely to reach the lower side of the optical fibers 3 through the gap between the optical fibers 3. As described above, as illustrated in FIG. 6C, when the air vent hole 15 is formed, the adhesive can be applied sufficiently to the upper and lower sides of the optical fibers 3, and formation of an air bubble on the lower side of the optical fibers 3 can be suppressed. Further, when the air vent hole 15 is formed, there is an advantageous point in that a time required for filling the adhesive can be reduced.

The operator fills the adhesive to be the refractive index matching material from the upper opening of the matching material filling part 1A. At this time, the refractive index matching material fills above the optical fibers 3 in the matching material filling part 1A, and then fills below the optical fibers 3 through a gap between the optical fibers 3, and permeates between the optical fiber endface and the abutment part. At this time, the lower opening of the matching material filling part 1A functions as an air vent, and thus the refractive index matching material is more likely to reach the lower side of the optical fibers 3 and less likely to build up on the upper side of the optical fibers 3. Accordingly, filling time needed to fill the refractive index matching material in the matching material filling part 1A can be shortened.

In one or more embodiments, the reception part 242 is formed at the upper edge of the filling recessed part 24 of the lens plate 20. Thus, in S106, an operation of filling a refractive index matching material in the matching material filling part 1A is facilitated. Further, when an excessive refractive index matching material is input to the matching material filling part 1A, the excessive amount of the refractive index matching material stays in the reception part 242, and hence the refractive index matching material can be prevented from overflowing from the upper side of the matching material filling part 1A. Also in this regard, an operation of filling a refractive index matching material in the matching material filling part 1A is facilitated.

When the adhesive to be the refractive index matching material fills the matching material filling part 1A in S106, the adhesive permeates through a minute gap between contact surfaces of the ferrule body 10 and the lens plate 20. In this way, when the adhesive is cured in the next processing, the ferrule body 10 and the lens plate 20 can be bonded and fixed together. This facilitates an operation of bonding and fixing the ferrule body 10 and the lens plate 20 together.

As illustrated in FIG. 7B, when the adhesive permeates through the fine gap between the contact surface of the ferrule body 10 and the contact surface of the lens plate 20, the adhesive may leak from the gap between the front end surface 10A of the ferrule body 10 and the rear end surface 20B of the lens plate 20 in some cases. However, in one or more embodiments, as illustrated in FIG. 7B, the rear recessed part 21B is formed in the rear end of the plate-side guide hole 21, and thus the adhesion of the adhesive to the guide pin can be suppressed. Note that, in one or more embodiments, the adhesive permeates through the gap between the ferrule body 10 and the lens plate 20, and thus the adhesive having relative low viscosity is used. Thus, when the adhesive adheres to the guide pin, the adhesive is more likely to permeate along the surface of the guide pin by capillarity. Thus, as in one or more embodiments, in the case where the adhesive permeates through the gap between the ferrule body 10 and the lens plate 20, formation of the rear recessed part 21B in the rear end of the plate-side guide hole 21 is particularly effective.

Next, the operator cures the adhesive (S107). When an ultraviolet curing resin is used as the adhesive, the operator applies ultraviolet rays. Alternatively, when an ultraviolet curing resin is used as the adhesive, the operator applies heat.

In one or more embodiments, as illustrated in FIG. 7B, the rear recessed part 21B is formed in the rear end of the plate-side guide hole 21, and thus the adhesion of the adhesive to the guide pin is suppressed. Thus, when the adhesive is cured, the guide pin can be prevented from being bonded and fixed to the body-side guide hole 11 and the plate-side guide hole 21. Thus, after the ferrule structure 1 is manufactured, it is easy to pull off the guide pin from the body-side guide hole 11 and the plate-side guide hole 21.

Method for Manufacturing Ferrule Structure 1 with Fiber (2):

In the manufacturing method described above, the adhesive to be the refractive index matching material fills the matching material filling part 1A in S106, and the adhesive permeates through the gap between the ferrule body 10 and the lens plate 20. In this manner, the ferrule body 10 and the lens plate 20 are bonded and fixed. However, before the adhesive to be the refractive index matching material fills the matching material filling part 1A, the ferrule body 10 and the lens plate 20 may be bonded and fixed.

Figure 12:
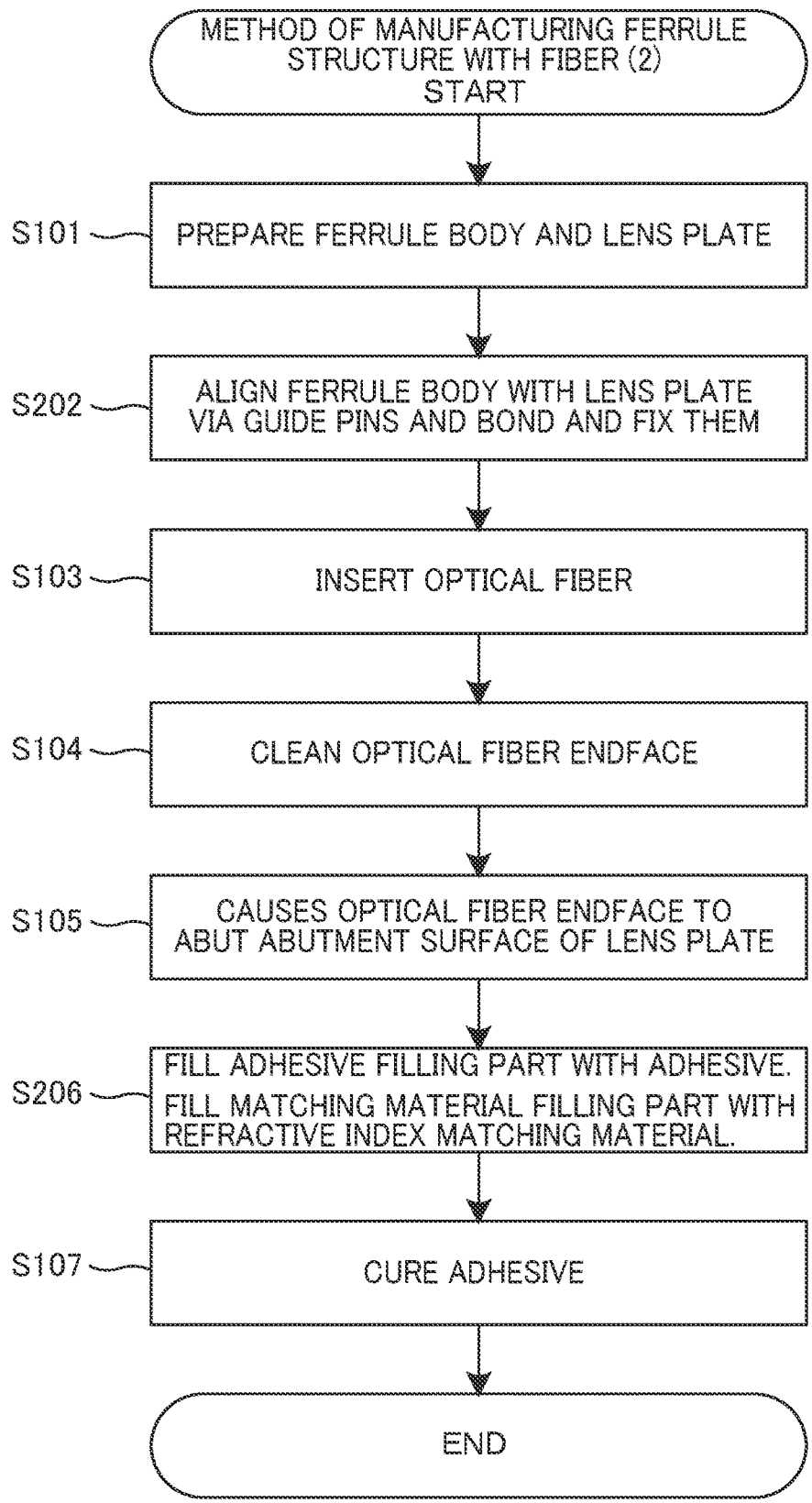
FIG. 12 is a flowchart of another method for manufacturing (a procedure for assembling) the ferrule structure 1 with a fiber.

FIG. 12 is a flowchart of another method for manufacturing (a procedure for assembling) the ferrule structure 1 with a fiber.

First, an operator prepares the ferrule body 10 and the lens plate 20 (S101). This step is the same as S101 in the flowchart of FIG. 11 described above.

Subsequently, the operator aligns the ferrule body 10 with the lens plate 20 via the guide pins, and bonds and fixes the ferrule body 10 and the lens plate 20 (S202). At this time, the operator applies the adhesive to at least one of the front end surface 10A of the ferrule body 10 and the rear end surface 20B of the lens plate 20, and brings the front end surface 10A of the ferrule body 10 and the rear end surface 20B of the lens plate 20 into contact under a state of inserting the guide pins (not illustrated) into both the body-side guide holes 11 of the ferrule body 10 and the plate-side guide holes 21 of the lens plate 20. When the adhesive applied between the ferrule body 10 and the lens plate 20 is cured, the ferrule body 10 and the lens plate 20 are bonded and fixed under a state of being aligned with the guide pins.

Note that, as illustrated in FIG. 7B, the adhesive may leak from the gap between the front end surface 10A of the ferrule body 10 and the rear end surface 20B of the lens plate 20 in some cases. However, in one or more embodiments, as illustrated in FIG. 7B, the rear recessed part 21B is formed in the rear end of the plate-side guide hole 21, and thus the adhesion of the adhesive to the guide pin can be suppressed.

In S202, when the ferrule body 10 and the lens plate 20 are bonded and fixed, the gap is formed between the lens plate 20 and the ferrule body 10 by the filling recessed part 24 of the lens plate 20, and the matching material filling part 1A is formed by the gap. The bottom surface (abutment surface 241) of the filling recessed part 24 of the lens plate 20 faces the openings of the fiber holes 12 of the ferrule body 10.

Subsequently, the operator inserts each of the optical fibers 3 of the optical fiber tape into corresponding fiber hole 12 of the ferrule body 10 (S103), cleans the optical fiber endface (S104), and advances the optical fiber 3 to cause the optical fiber endface to abut the abutment surface 241 of the lens plate 20 (S105). Those steps are the same as S103 to S105 in the flowchart of FIG. 11 described above.

Subsequently, the operator fills the adhesive in the adhesive filling part 14, and fills the refractive index matching material in the matching material filling part 1A (S206). This step is substantially the same as S106 in the flowchart of FIG. 11 described above. However, the ferrule body 10 and the lens plate 20 are already bonded and fixed in S202. Thus, herein, the adhesive is not required to permeate through the gap between the ferrule body 10 and the lens plate 20. Thus, the number of options for the refractive index matching material filling the matching material filling part 1A can be increased. For example, it is possible to adopt a refractive index matching material having viscosity that is less likely to permeate through the gap between the ferrule body 10 and the lens plate 20. Further, the refractive index matching material filling the matching material filling part 1A is not limited to the adhesive.

Next, the operator cures the adhesive (S107). This step is the same as S107 in the flowchart of FIG. 11 described above. According to the manufacturing method described above, the ferrule body 10 and the lens plate 20 are bonded and fixed in S202, and hence, a jig for assembling the ferrule body 10 and the lens plate 20 is not required in the steps thereafter. Thus, an operation is facilitated.

Method for Manufacturing Ferrule Structure 1 with Fiber (3):

In the manufacturing method described above, the ferrule body 10 and the lens plate 20 are assembled (see S101 and S102), and then the optical fibers 3 are inserted into the fiber holes 12 of the ferrule body 10 (S103). However, the ferrule body 10 and the lens plate 20 may be assembled after inserting the optical fibers 3 into the fiber holes 12 of the ferrule body 10.

Figure 13:
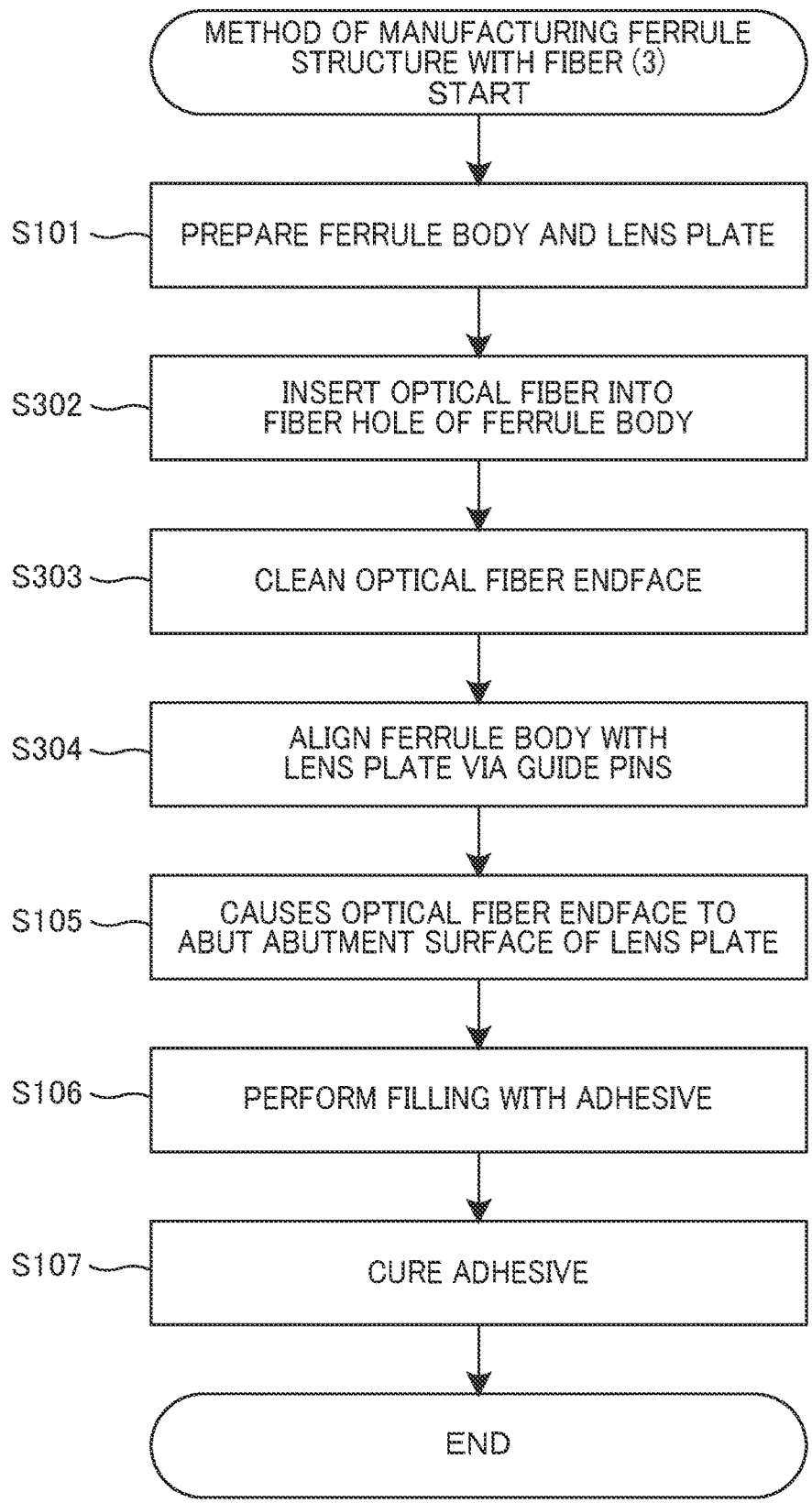
FIG. 13 is a flowchart of still another method for manufacturing (a procedure for assembling) the ferrule structure 1 with a fiber.

FIG. 13 is a flowchart of still another method for manufacturing (a procedure for assembling) the ferrule structure 1 with a fiber. Further, FIG. 14A to FIG. 14D are cross-sectional explanatory views illustrating the states of the respective steps illustrated in FIG. 13.

First, an operator prepares the ferrule body 10 and the lens plate 20 (S101). This step is the same as S101 in the flowchart of FIG. 11 described above.

Figure 14A:
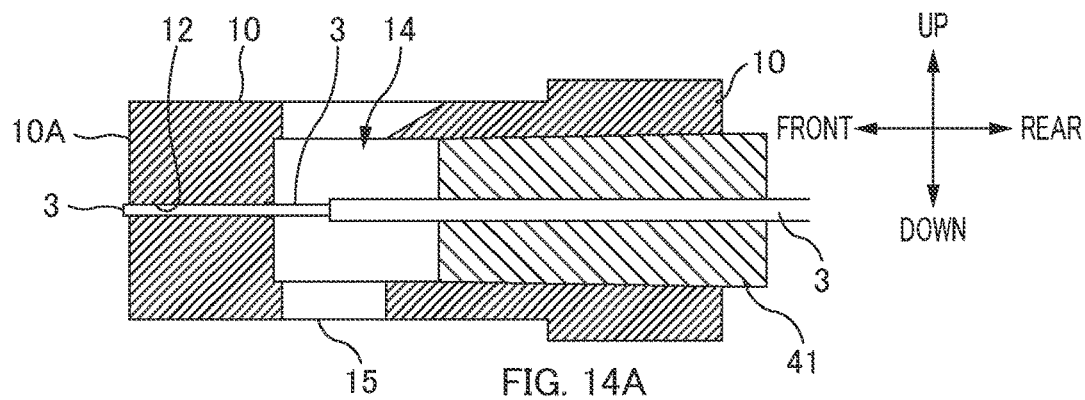
FIG. 14A to FIG. 14D are cross-sectional explanatory views illustrating states of processes in FIG. 13.

Next, the operator inserts each of the optical fibers 3 of the optical fiber tape into each of the fiber holes 12 of the ferrule body 10 (S302). Then, as illustrated in FIG. 14A, the optical fiber 3 protrudes from the front end surface 10A (opening surface of the fiber hole 12) of the ferrule body 10. Note that dust and the like may adhere to the optical fiber endface when the optical fiber 3 passes through the fiber hole 12.

Then, the operator cleans the optical fiber endface (S303). For example, the operator blows air onto the optical fiber endface protruding from the front end surface 10A of the ferrule body 10, and blows off dust adhering to the optical fiber endface. In this way, dust on the optical fiber endface adhering when the optical fiber 3 is inserted into the fiber hole 12 (S302) can be removed. Note that, at this stage, as illustrated in FIG. 14A, the lens plate 20 is not assembled to the ferrule body 10, and hence an operation of cleaning the optical fiber endface protruding from the front end surface 10A of the ferrule body 10 is facilitated.

Next, the operator aligns the ferrule body 10 with the lens plate 20 via the guide pins (S304). Here, the ferrule body 10 and the lens plate 20 are not bonded and fixed. However, similarly to S202 described above, before the adhesive that functions as the refractive index matching material fills the matching material filling part 1A, the ferrule body 10 and the lens plate 20 may be bonded and fixed.

Figure 14B:
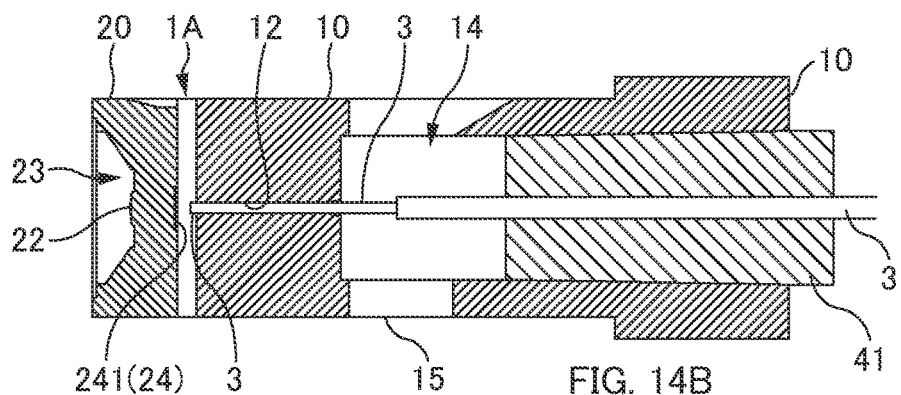
Figure 14C:
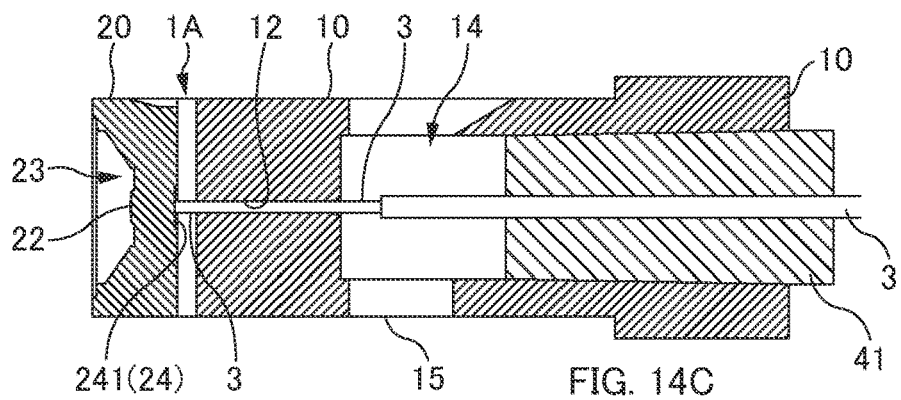
Figure 14D:
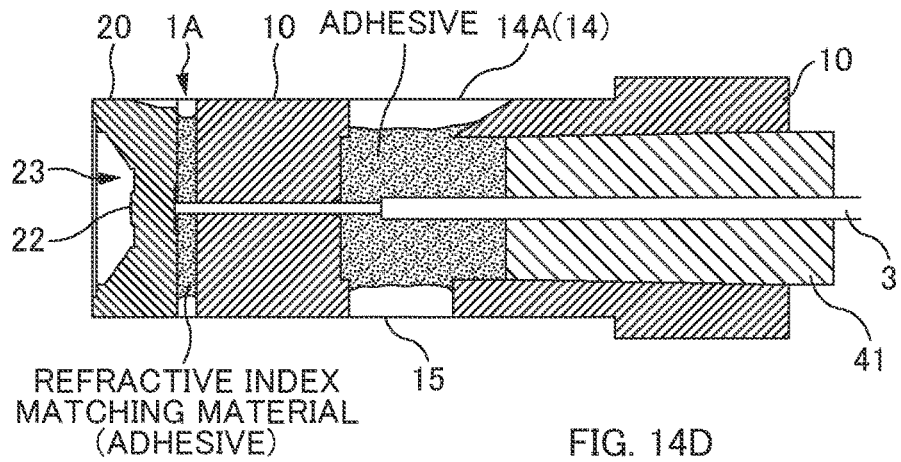

In S304, when the ferrule body 10 and the lens plate 20 are aligned, as illustrated in FIG. 14B, the gap is formed between the lens plate 20 and the ferrule body 10 by the filling recessed part 24 of the lens plate 20, and the matching material filling part 1A is formed by the gap. The bottom surface (abutment surface 241) of the filling recessed part 24 of the lens plate 20 faces the openings of the fiber holes 12 of the ferrule body 10. As illustrated in FIG. 14B, in this stage, the optical fiber endface does not abut the abutment surface 241 (bottom surface of the filling recessed part 24) of the lens plate 20. In other words, from S302 to S304, a length of the end part of the optical fiber, which projects from the front end surface 10A of the ferrule body 10, is smaller than the width of the filling recessed part 24.

Subsequently, the operator further inserts the optical fiber 3, and causes the optical fiber endface to abut the abutment surface 241 of the lens plate 20 (S105: see FIG. 14C), fills the adhesive (S106: see FIG. 14D), and cures the adhesive (S107). Those steps are the same as S105 to S107 in the flowchart of FIG. 11 described above. Herein, the adhesive that functions as the refractive index matching material fills the matching material filling part 1A in S106, and the adhesive permeates through the gap between the ferrule body 10 and the lens plate 20. In this manner, the ferrule body 10 and the lens plate 20 are bonded and fixed. However, when the ferrule body 10 and the lens plate 20 are bonded and fixed in S304 described above, the adhesive is not required to permeate through the gap between the ferrule body 10 and the lens plate 20. In either case, the rear recessed part 21B is formed in the rear end of the plate-side guide hole 21. Thus, as illustrated in FIG. 14B, adhesion of the adhesive to the guide pin can be suppressed.

Figure 15:
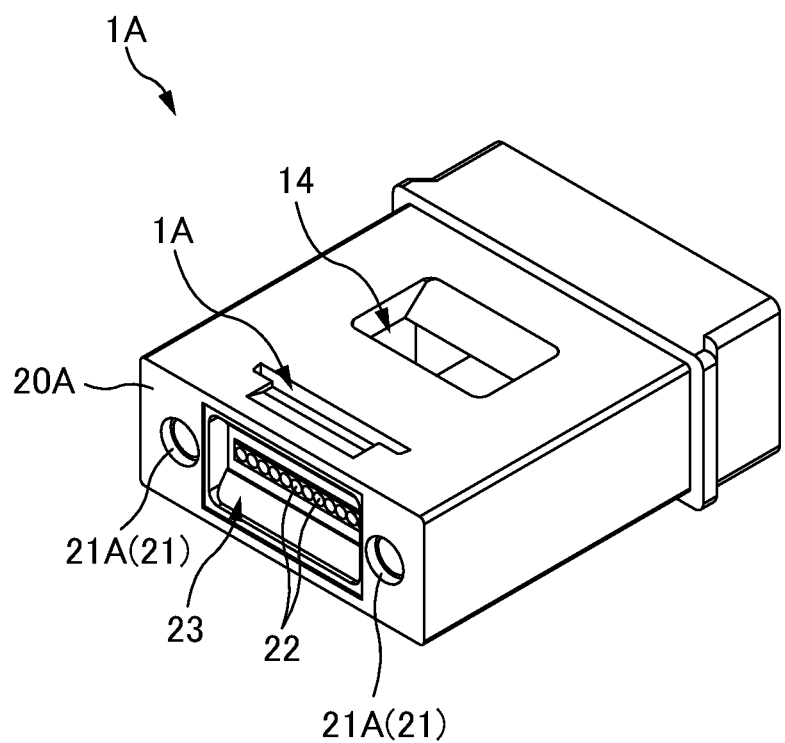
FIG. 15 is a different general perspective view of a ferrule structure 1 according to one or more embodiments.

FIG. 15 is a general perspective view of a ferrule structure 1 according to one or more embodiments. Unlike one or more embodiments described above, the ferrule structure 1 according to one or more embodiments is not formed of separate members being the ferrule body 10 and the lens plate 20, but is formed integrally with the ferrule body 10 and the lens plate 20.

In the ferrule structure 1 according to one or more embodiments, the ferrule structure 1 also includes the plurality of fiber holes 12 (not illustrated in FIG. 15), the recess 23, and the lens array formed of the plurality of lens parts 22. Further, in one or more embodiments, the groove part 231 recessed from the base surface 23A having the lens array formed thereon is also formed on the outer side of the lens array. In one or more embodiments, the peripheral space of the lens array is also increased by providing the groove part 231. Thus, also in one or more embodiments, a water droplet enters the space increased by the groove part 231, and thus adhesion of the water droplet to the lens part 22 can be suppressed as compared to the case without the groove part 231.

Figure 16A:
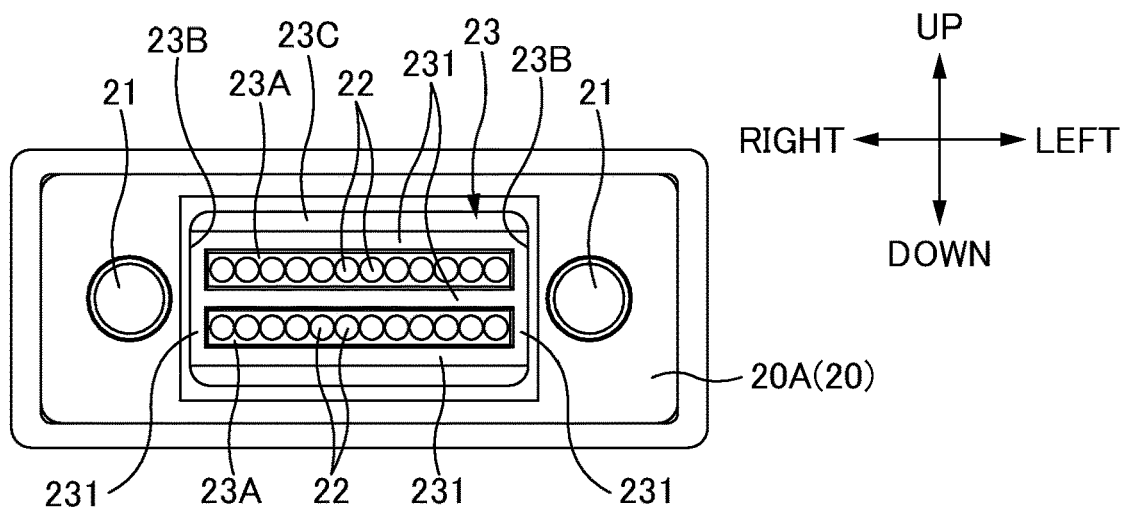
FIG. 16A is a different front view of a ferrule structure 1 according to one or more embodiments.

FIG. 16A is a front view of a ferrule structure 1 according to one or more embodiments. In one or more embodiments described above, the two lens arrays formed of the plurality of lens parts 22 aligned in the left-right direction are provided. The two lens arrays are arranged side by side in the up-down direction (the direction orthogonal to the left-right direction).

In one or more embodiments, the groove part 231 is formed in each of the outer sides of the lens arrays. In one or more embodiments, a water droplet enters the space increased by the groove part 231, and thus adhesion of the water droplet to the lens part 22 can also be suppressed as compared to the case without the groove part 231.

Figure 16B:
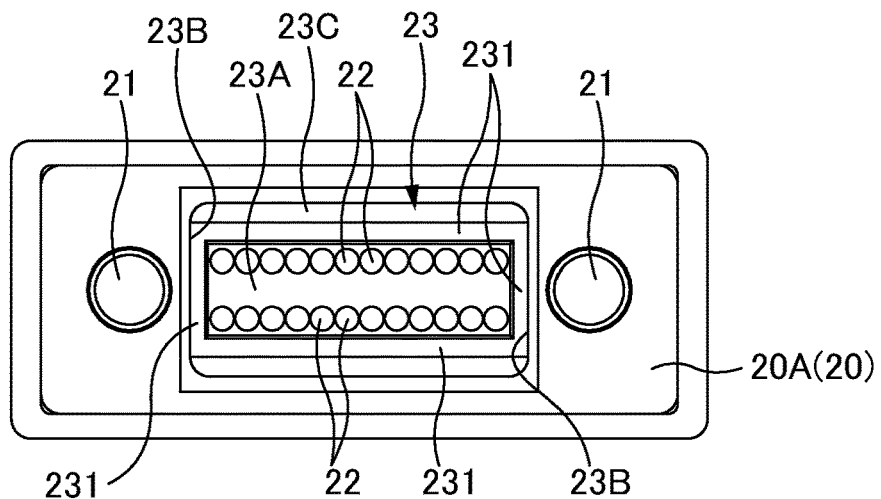
FIG. 16B is a different front view of a ferrule structure 1 according to one or more embodiments.

FIG. 16B is a front view of a ferrule structure 1 according to one or more embodiments. Similarly to one or more embodiments described above, in one or more embodiments, the two lens arrays formed of the plurality of lens parts 22 aligned in the left-right direction are provided. However, in one or more embodiments, the two lens arrays are formed on the common base surface 23A.

In one or more embodiments, the groove part 231 is formed so as to surround the outer side of the common base surface 23A having the two lens arrays formed thereon, and thus the groove part 231 is formed on the outer sides of the two lens arrays. In one or more embodiments, the groove part 231 is not formed between the two lens arrays, thus adhesion of a water droplet between the two lens arrays can be suppressed.

Figure 16C:
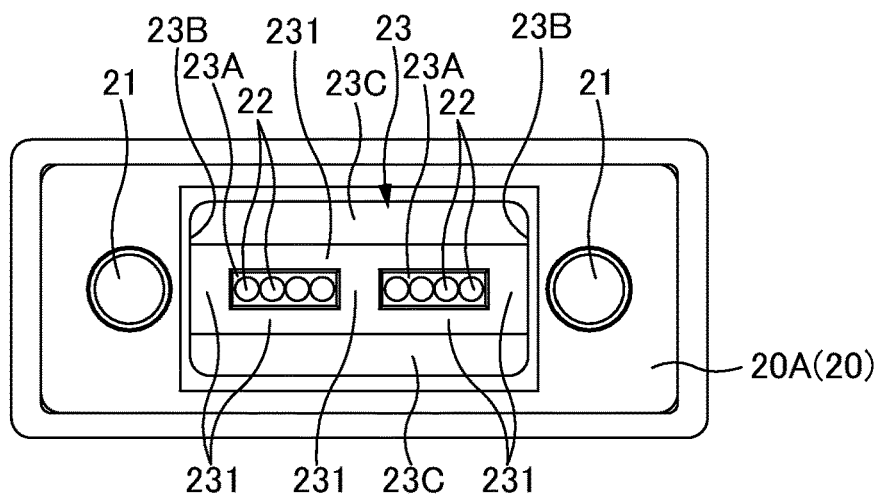
FIG. 16C is a different front view of a ferrule structure 1 according to one or more embodiments.

FIG. 16C is a front view of a ferrule structure 1 according to one or more embodiments. Similarly to one or more embodiments described above, in one or more embodiments, the two lens arrays formed of the plurality of lens parts 22 aligned in the left-right direction are also provided. How-ever, in one or more embodiments, the two lens arrays are arranged side by side in the left-right direction (the direction in which the plurality of lens parts 22 forming the lens array are aligned).

In one or more embodiments, the groove part 231 is formed in each of the outer sides of the lens arrays. In one or more embodiments, a water droplet enters the space increased by the groove part 231, and thus adhesion of the water droplet to the lens part 22 can also be suppressed as compared to the case without the groove part 231.

In one or more embodiments, the groove part 231 is formed between the two lens arrays. In one or more embodiments, a water droplet adhering to the groove part 231 on each of the upper sides of the lens arrays (the upper groove part 231 extending in the left-right direction) is more likely to fall down through the groove part 231 formed between the two lens arrays. Thus, adhesion of a water droplet to the lens part 22 can be suppressed. Note that, in one or more embodiments, the two lens arrays are arranged in the left-right direction. Thus, unlike one or more embodiments described above, the groove part 231 between the two lens arrays is relatively short, and hence a water droplet is less likely to stay in the groove part 231 between the two lens arrays.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Ferrule structure;
1A: Matching material filling part;
3: Optical fiber;
10: Ferrule body;
10A: Front end surface;
11: Body-side guide hole;
12: Fiber hole (holding part);
13: Fiber insertion opening;
14: Adhesive filling part;
14A: Filling port;
15: Air vent hole;
20: Lens plate;
20A: Front end surface;
20B: Rear end surface;
21: Plate-side guide hole;
21A: Front recessed part;
21B: Rear recessed part;
22: Lens part (lens array);
23: Recess;
23A: Base surface;
23B: Side wall surface;
23C: Inclined surface;
231: Groove part;
232: Step surface;
24: Filling recessed part;
241: Abutment surface;
242: Reception part; and
41: Boot.

The invention claimed is:
1. A ferrule structure comprising:
a holding aperture that holds light guide members forming light guides;
a recess that is recessed from a connection end surface with respect to a mating ferrule;
a first lens array on a base surface that is a bottom surface of the recess, wherein the first lens array comprises lenses that are aligned with the light guides;
a first groove that is recessed from the base surface and is on an outer side of the first lens array; and
an inclined step surface between the base surface and a bottom surface of the first groove.

2. The ferrule structure according to claim 1, wherein the first groove is between one of the lenses at an end part of the first lens array and a side wall surface of the recess.

3. The ferrule structure according to claim 1, wherein a width of the base surface between an edge of one of the lenses and the first groove is equal to or smaller than a radius of that lens.

4. The ferrule structure according to claim 1, further comprising:
- an antireflection film disposed on a surface of one of the lenses; and
- an inner wall surface of the recess inclined to be wider toward an opening side of the recess.

5. The ferrule structure according to claim 1, further comprising:
- a ferrule body comprising the holding aperture, wherein the holding aperture is on an opening surface of the ferrule body; and
- a lens plate comprising the recess and the first lens array; and
- a filling recess in at least one of the ferrule body and the lens plate, wherein
- the filling recess forms a gap that is filled with a refractive index matching material between the opening surface of the ferrule body and an abutment surface of the lens plate.

6. A ferrule structure comprising:
- a holding aperture that holds light guide members forming light guides;
- a recess that is recessed from a connection end surface with respect to a mating ferrule;
- a first lens array on a base surface that is a bottom surface of the recess, wherein the first lens array comprises first lenses that are aligned with the light guides;
- a first groove that is recessed from the base surface and is on an outer side of the first lens array;
- a second lens array on the base surface, wherein the second lens array comprises second lenses that are aligned with the light guides; and
- a second groove that is recessed from the base surface and is on an outer side of the second lens array.

7. The ferrule structure according to claim 6, wherein
the first lens array and the second lens array are aligned in a direction in which the first lenses of the first lens array are aligned; and
a third groove is between the first lens array and the second lens array.

8. The ferrule structure according to claim 1, wherein the first groove is on an outer side of the base surface that comprises at least two lens arrays.

* * * * *